United States Patent [19]

Best et al.

[11] Patent Number: 4,940,079
[45] Date of Patent: Jul. 10, 1990

[54] OPTIMAL CONTROL SYSTEM FOR REFRIGERATION-COUPLED THERMAL ENERGY STORAGE

[75] Inventors: Jerry Best, Sacramento; Richard C. Bourne; Marc Hoeschele, both of Davis; Willem Bos, Sacramento, all of Calif.

[73] Assignee: Phenix Heat Pump Systems, Inc., Elk Grove, Calif.

[21] Appl. No.: 230,897

[22] Filed: Aug. 11, 1988

[51] Int. Cl.[5] .............................................. F25B 13/00
[52] U.S. Cl. .......................................... 165/2; 165/18; 165/28
[58] Field of Search ....................... 165/18, 2; 126/419; 62/59, 185

[56] References Cited

U.S. PATENT DOCUMENTS 4,061,185 12/1977 Faiczak .............................. 165/18 X
4,292,811 10/1981 Kamejima et al. ................ 165/18 X
4,693,089 9/1987 Bourne et al. ............................ 62/79

FOREIGN PATENT DOCUMENTS 782505 9/1957 United Kingdom ................... 165/18

OTHER PUBLICATIONS

"Agastat Series PCU—Ultrasonic Proximity Sensor—Installation and Operating Information Analog Output Models", Jun., 1986.
"AGASTAT Ultrasonic Proximity Sensor", Steven Engineering, Jan., 1987.
"AGASTAT Inductive/Capacitive Proximity Sensors", Steven Engineering, May, 1986.

Primary Examiner—William E. Wayner

[57] ABSTRACT

A refrigeration-coupled thermal energy storage control system includes apparatus and methodology for establishing target cooling and heating storage conditions, and selecting between cooling and heating modes, based upon outdoor temperature history, and for operating the system until the target storage conditions are achieved. In the cooling mode, cooling storage quantity increases with increases in outdoor temperature, and in the heating mode heating storage quantity increases with decreases in outdoor temperature. The system further includes apparatus and methodology for biasing operation of cooling, heating and domestic hot water production modes during off-peak periods, rather than during on-peak periods. The system incorporates logic for fan coil pump seasonal interlocking, outdoor heat exchanger fan operation, outdoor heat exchanger coil defrosting, and compressor crankcase heater operation.

66 Claims, 12 Drawing Sheets

*COMMENCE AT TARGET MINUS HYSTERESIS

OPTIMAL CONTROL SYSTEM FOR REFRIGERATION-COUPLED THERMAL ENERGY STORAGE

BACKGROUND OF THE INVENTION

This invention relates to the control of refrigeration-coupled thermal energy storage systems for buildings. More particularly, the invention relates to control systems and methodologies which allow building heating, cooling, and water heating loads to be satisfied from refrigeration-coupled thermal energy storage systems with minimal electrical energy input to drive the refrigeration compressor, liquid pumps, and fans.

Electric utilities increasingly pursue strategies to level the overall electrical use pattern among their customers, as a means to improve their economics. Cooling and heating loads in buildings comprise significant elements of overall electrical energy use. Refrigeration-coupled thermal energy storage (RCTES) systems provide a means for accomplishing significant shifts in electrical use patterns for building cooling and heating systems. RCTES systems allow decoupling of compressor operation from building loads; instead of operating when a building thermostat demands heating or cooling, the RCTES compressor runs to accomplish a desired thermal storage condition sufficient to satisfy subsequent thermostat demands from the building.

To foster introduction of RCTES systems, many electric utilities offer "time-of-use" rates under which customer "per kilowatt-hour" energy charges are increased for on-peak use and decreased for off-peak use. Many utilities also offer initial incentive payments for installation of RCTES systems. In response to these utility load-shift programs, both single function (cooling or heating) and multiple function (cooling and heating and/or domestic water heating) RCTES systems are in use for both commercial and residential applications. U.S. Pat. Nos. 4,242,873, 4,270,518, 4,030,312, 4,242,872, 4,392,359, 4,302,942, 4,256,475, 4,246,956, 4,336,692, 4,279,359, 4,011,731, 4,645,908, 4,685,307 and 4,693,089 disclose various RCTES systems. U.S. Pat. No. 4,693,089 describes the RCTES system for which the optimal control system disclosed herein was developed.

Since a major goal of RCTES systems is to cause compressor operation during off-peak hours rather than in response to building thermostats, compressor control components in addition to the building thermostat are required. One simple RCTES control strategy initiates compressor operation at the end of each on-peak period, maintaining operation until either the off-peak period ends or a target storage condition is achieved (where the target condition is adequate to satisfy loads with extreme anticipated seasonal weather conditions). However, this simple strategy usually results in reduced operating efficiency because normal weather conditions allow lower target storage conditions than are required for extremes. Efficiency is reduced because heat pump efficiency is decreased and storage container thermal losses are increased by colder summer and warmer winter average storage temperatures.

Modern electronics offer potential for more sophisticated control systems designed to increase RCTES efficiency by regularly computing new storage targets based on current weather and storage conditions. Few of the prior systems disclose advanced control strategies. U.S. Pat. No. 4,270,518 presents one such strategy, for heating season operation of a solar-boosted RCTES system, but the heating-mode controller does not consider a time-of-use utility schedule. U.S. Pat. Nos. 4,645,908 and 4,685,307 disclose considerable detail on a residential RCTES system, but the system does not automatically vary storage targets with outdoor weather conditions; much of the description relates to monitoring capabilities designed to limit overall on-peak house energy consumption.

Prior systems also lack other desirable control capabilities for RCTES systems. For potential "packaged system" cooling storage applications, it is desirable to limit storage volume requirements by utilizing a liquid/solid phase change (usually via freezing and thawing of ice). In such phase change storage systems, improved system control requires frequent monitoring of ice volume. A reliable and accurate system for monitoring ice fraction is necessary for accurate system control. It is also desirable for both cooling and heating RCTES systems to modify storage targets based on their recent history. For example, a system which for several daily cooling cycles ends the on-peak period with large ice fractions may learn that its targets are too high, reducing subsequent targets to increase efficiency.

Combined cooling/heating RCTES systems must reverse the storage condition from hot to cold and back at least once per year. The prior systems fail to provide automatic reversal controls, yet manual reversals may adversely affect operating costs and/or occupant comfort. Combined systems sized with adequate ice storage for fully off-peak cooling operation may require some on-peak heating operation to avoid use of inefficient resistance heating. Intelligent controls are required to allow, yet minimize, the on-peak heating season compressor operation. In most winter climates, a control strategy is also necessary to defrost outdoor heat exchangers used as heat sources during the heating season. Defrost controls are generally known, but improvements are possible to reduce defrost energy consumption.

In RCTES systems which provide full domestic water heating in addition to space conditioning, control logic is necessary to determine priority between space conditioning and water heating functions, and to bias "domestic water only" cycles toward off-peak operation. The prior systems do not consider control requirements to accomplish these tasks. Also, high ambient summer temperatures endanger the compressor when an outdoor heat exchanger is used as a heat source during domestic water cycles; special controls are needed to protect operating components.

SUMMARY OF THE INVENTION

It is an object of the invention to improve the performance of RCTES systems by implementating control strategies which satisfy building thermal loads with reduced system energy consumption.

A further object of the invention is to vary target thermal storage conditions with current and recent average and extreme weather conditions.

A further object of the invention is to prevent excessive storage target conditions by automatically learning from past operating patterns.

A further object of the invention is to select optimal time windows for compressor operation to minimize energy costs.

A further object of the invention is accurate determination of solid storage fraction in a phase change thermal storage system.

A further object of the invention is automatic water refill in atmospheric pressure RCTES tanks.

A further object of the invention is to provide RCTES automatic seasonal changeover which minimizes annual energy consumption.

A further object of the invention is to prioritize system response by function for multi-function RCTES systems.

A further object of the invention is to minimize energy consumption of compressor crankcase heaters in RCTES systems.

A further object of the invention is to control RCTES system outdoor fan operation for compressor protection during domestic water heating cycles.

A further object of the invention is to minimize energy losses of RCTES system outdoor coil frost removal techniques used during heat storage cycles.

These and other objects, advantages, and features are provided by the RCTES controller in accordance with the invention. The controller includes a microprocessor; temperature inputs from the storage containers, the outdoors, the compressor crankcase, and the outdoor heat exchange coil; a storage volume sensor; and output switches for on/off control of RCTES motors and valves. The microprocessor includes sufficient memory to store both recent operating data and programs which determine system operation. Program data includes utility time-of-use (TOU) schedules, mathematical functions for storage condition targets, and logic for:

(1) automatic water refill;

(2) computation of solid storage fraction from storage volume;

(3) selection of heat, cool, or coast mode depending on weather conditions;

(4) lockout of the outdoor fan in certain domestic water heating conditions for compressor protection;

(5) biasing operation both toward most favorable offpeak hours and toward domestic water heating mode if provided;

(6) optimal operation of a crankcase heater designed to prevent liquid refrigerant from accumulating in the compressor during off-cycles; and (7) optimal operation to remove frost from the outdoor coil.

BRIEF DESCRIPTION OF THE DRAWINGS

The invention will be described in detail hereinafter with reference to the following figures and tables wherein.

DETAILED DESCRIPTION OF THE PREFERRED EMBODIMENTS

Optimal RCTES control systems will be described in conjunction with the most comprehensive RCTES system to which their application is anticipated, namely one which provides three building thermal energy functions (space heating, space cooling, and domestic water heating), and includes a solid/liquid thermal storage phase change in one space conditioning mode, in a vented atmospheric pressure storage tank requiring automatic liquid refill. However, the invention also is applicable to single function heating or cooling systems. Those skilled in the art may visualize adaptations to simpler and/or different applications without departing from the spirit and scope of the invention as defined in the appended claims.

Figure 1:
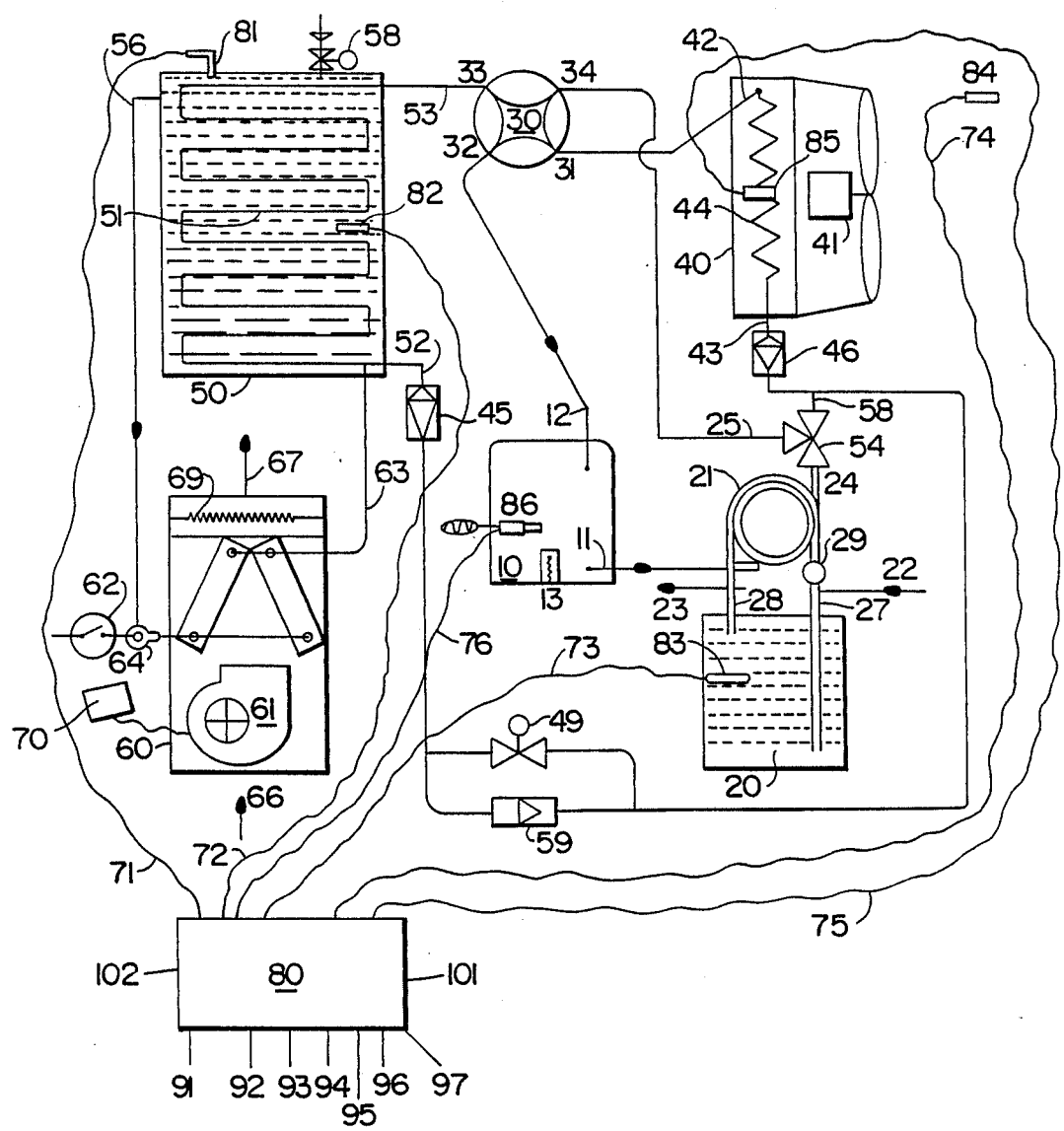
FIG. 1 is a schematic diagram of a three-function RCTES system including controls in accordance with the present invention.

The control system will be described with reference to the three function heat pump of U.S. Pat. No. 4,693,089, the disclosure of which is herein fully incorporated by reference. With reference to FIG. 1 illustrating a simplified version of the optimal RCTES control system applied to a three function system, the system includes a compressor 10 which pressurizes the preferred Freon-22 refrigerant. The compressor 10 may include a crankcase heater 13 to be operated at certain off-cycle times to prevent liquid refrigerant from condensing in the compressor, as may occur when the compressor is colder than other system components. Alternatively, the compressor may be located in an insulated enclosure with the domestic water tank so that the compressor cannot be the coldest system component.

Refrigerant enters the compressor as a low pressure gas through inlet line 12 and exits as a high pressure gas through outlet line 11. From the compressor, hot gas enters the domestic water heat exchanger 21, which acts either as a desuperheater (space conditioning storage modes) or as a condenser (domestic water only mode). In space conditioning storage modes, desuperheating occurs in heat exchanger 21 when pump 29 is activated to circulate water from domestic hot water (DHW) tank 20 through line 27 into heat exchanger 21 and back into tank 20 through line 28. Pump 29 is always activated with compressor 10 unless water in tank 20 is warmer than a preset upper limit temperature (typically 150 degrees Fahrenheit).

Hot water is withdrawn for domestic use from tank 20 through line 23 connected to tank outlet 28 or from a separate connection at the top of tank 20. Cooler makeup water enters through line 22 connected to tank inlet 27 or through a separate connection or dip tube.

To operate in the "domestic hot water only" mode, automatic valve 54 is activated to direct condensed liquid refrigerant from heat exchanger exit line 24 through valve outlet 58 and one-way throttle 46 (each of throttles 45 and 46 throttles in the direction of the small triangle but permits free flow in the direction of the large triangle) into outdoor heat exchanger 40 via inlet 43. Heat exchanger 40 comprises a finned tubing coil 44 through which the refrigerant passes, and outdoor fan 41 which directs outdoor air across coil 44. Refrigerant entering heat exchanger 40 through one-way throttle 46 is evaporated to become a low pressure gas, extracting heat from outdoor air. The low pressure gas leaves heat exchanger 40 through outlet 42 to enter reversing valve 30 through inlet 31 on its return trip to the compressor 10 via reversing valve outlet 32.

In space heating and cooling storage modes, automatic valve 54 is not operated and refrigerant leaves valve outlet 25 enroute to inlet 34 of reversing valve 30. In heating storage mode, reversing valve 30 is activated and high pressure refrigerant gas is directed through outlet 33 to enter heat exchanger 51 in space conditioning storage tank 50 via line 53. Refrigerant is condensed to a high pressure liquid state in tank 50 and exits through line 52, passing easily through one-way throttle 45 and one-way valve 59 (automatic cooling valve 49, which will be described below, remains closed in the heating storage mode) enroute to one-way throttle 46. From this point, the flow sequence is identical to that previously described for the "domestic hot water only" operating mode.

In cooling storage mode, reversing valve 30 is not activated so that high pressure refrigerant gas leaves through outlet 31 to enter outdoor heat exchanger 40, where it is condensed to a high pressure liquid state. The liquid flows easily through one-way throttle 46 and automatic cooling valve 49 (flow is blocked by one-way valve 59), which is activated in cooling storage mode, and is then restricted by one-way throttle 45 prior to entering tank 50 through line 52. The low pressure liquid evaporates in heat exchanger 51 to chill water in tank 50. The amount of water in tank 50 is controlled by an inlet fill valve 58 to maintain a sufficient quantity of water in the tank 50. When tank water is sufficiently chilled, ice is formed on heat exchanger 51, and the cooling cycle may continue until a maximum of approximately 75% of tank water volume is converted to ice. Low pressure gas leaving tank 50 through line 53 enters inlet line 33 of reversing valve 30, leaving through outlet 32 to return to the compressor.

For simplicity, accumulator components required for refrigerant volume control are omitted from the schematic diagram. However, these components can be incorporated into the system as described in U.S. Pat. No. 4,693,089.

Space conditioning is provided by fan coil 60 in response to demand from building thermostat 70. When the thermostat calls for heating or cooling, water from tank 50 is circulated by fan coil pump 64 to heat exchange coil 68 before returning to the tank through line 63. Return air 66 is forced through coil 68 by blower 61 to temper supply air 67. In spring and fall, tank 50 is biased toward cooling; heat is supplied if necessary by electrical resistance heat strips 69 in fan coil 60. System logic prevents delivery from tank 50 of chilled water during heating conditions and hot water during cooling conditions as described below. Operation of the fan coil pump 64 is controlled by a lockout switch 62 which selectively actuates the pump 64.

Microprocessor controller 80 determines RCTES operation and also provides an interlock or prevention mechanism to prevent counterproductive operation of fan coil 60, i.e., demand for heat when the system is in the cooling mode, or demand for cooling when the system is in the heating mode. Controller 80 uses input data provided by sensor signal wires or connections 71 through 76 from level sensor 81 in tank 50 and temperature sensors 82 in tank 50, 83 in tank 20, 84 in outdoor air, 85 at the midpoint of coil 44, and 86 in the compressor crankcase, to determine operation of compressor 10 via power wire 91, crankcase heater 13 via power wire 92, reversing valve 30 and cooling valve 49 (operated together) via power wire 93, outdoor fan 41 via power wire 94, fill valve 58 via power wire 95, "domestic hot water only" (DHW) valve 54 via power wire 96, and lockout switch 62 for fan coil pump 64 via power wire 97.

Figure 2:
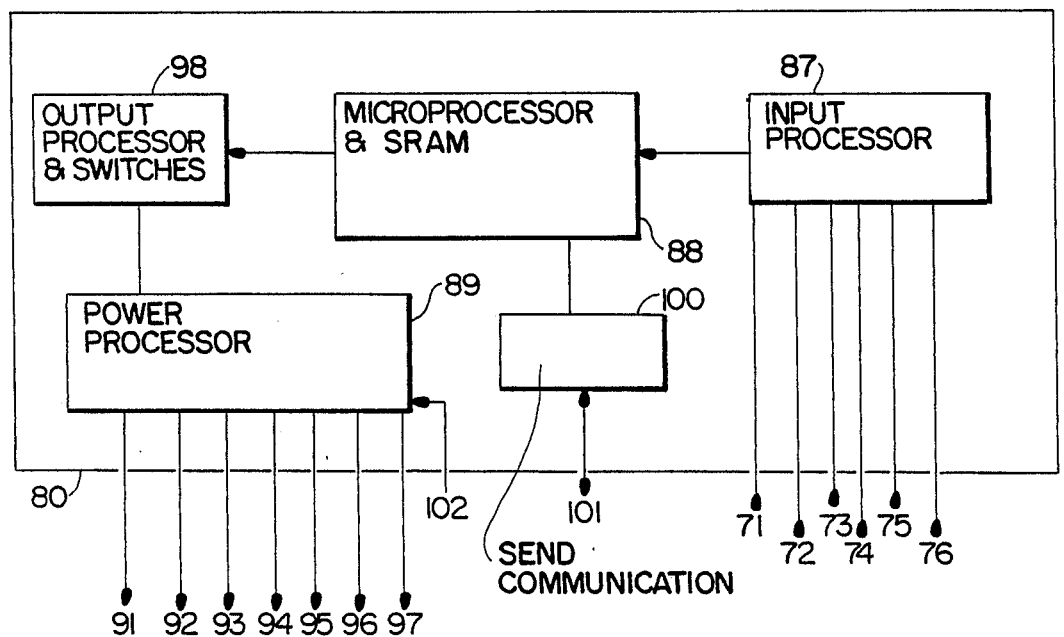
FIG. 2 is a block diagram showing major components of the microprocessor-based control unit.

FIG. 2 provides a simplified block diagram illustrating key control system components. Controller 80 includes previously identified connections 71 through 76 for the level sensor 81 and temperature sensors 82, 83, 84, 85 and 86, respectively, and power wires 91 through 97 for the compressor 10, crankcase heater 13, reversing and cooling valves 30, 49, outdoor fan 44, fill valve 58, DW valve 54 and lockout switch 62, respectively. The controller 80 also includes a serial communicator 100 which permits input via line 101 to allow the regulating authority or utility to monitor operation of the system or reprogram it in the event of a change in climate conditions or utility time of use schedules. A power line 102 is also provided to direct current into the controller as discussed below. Input signals from connections 71 through 76 are directed to input processor 87 enroute to microprocessor 88. The input processor 87 includes an RF damper, voltage transient suppressor, multiplexer, analog-to-digital converter, and gain control components.

Microprocessor 88 is the brain of the control system, and includes the operating program logic, calendar/clock, input variables including the utility time-of-use schedule, and RAM for storage of input and computed values. Based on its sensed inputs, microprocessor 88 determines which system components must operate, and delivers its operating instructions to output processor 98 which includes an opto-isolator, triac low voltage switches, and other components. Signals from the output processor are delivered to power processor 89 which switches line voltage electrical power from power line 102 to activate system components via power wires 91 through 97. In the power processor 89, line voltage from power line 102 is applied to a transformer to provide low voltage power for control circuits. A backup battery (not shown) is provided to maintain low voltage power to the microprocessor in the event input power is lost at line 102.

The controller 80 includes a clock and memory which cooperate to identify on-peak or off-peak periods from the utility time-of-use schedule, and to determine maximum, minimum, and average 24 hour outdoor temperatures, current outdoor temperature and the temperatures of the DHW tank 20 and main storage tank 50, all of these values being stored and periodically updated. The controller memory also stores various input values (as described below) for comparison of sensed current and previous system conditions with later sensed conditions. All input values are initialized prior to entering the normal control cycle.

Figure 3:
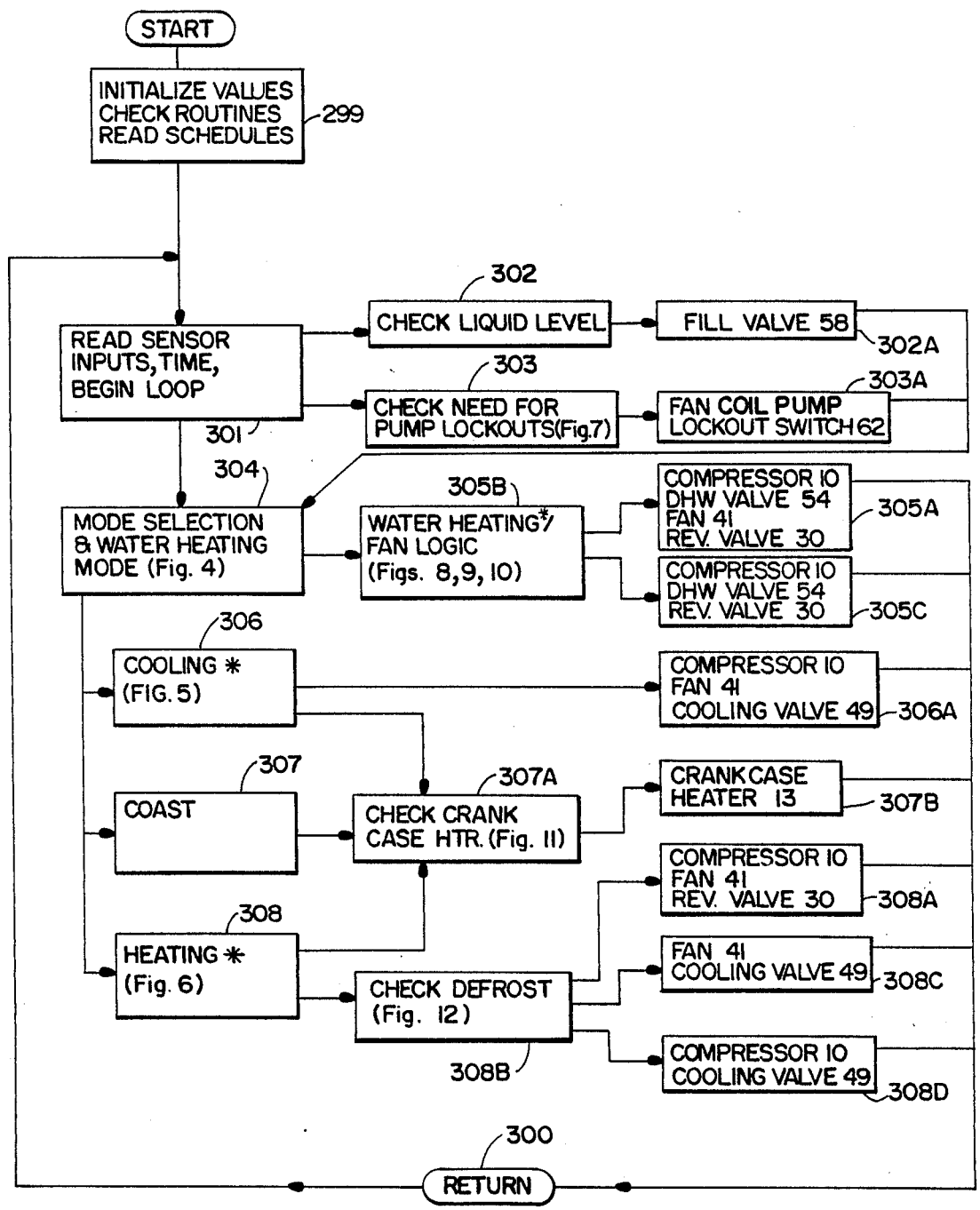
FIG. 3 is a flow chart illustrating overall system control logic.

A summary of the overall control system will be described with reference to FIG. 3, with the individual logic blocks of FIG. 3 being described herein in detail. With reference to FIG. 3 illustrating overall control system operating strategy, the microprocessor initializes values, checks routines and reads schedules in step 299 at initial start-up, and then performs a repetitive cycle approximately every six seconds throughout the year. Each cycle begins with clock and sensor readings in step 301 to determine current time and conditions. Checks of the liquid level in the main storage tank 50 in Step 302 and fan coil pump interlock in step 303 are performed before a system operating mode is assigned. The fill valve 58 and/or fan coil pump lockout switch 62 are activated as necessary in steps 302A and 303A as described below.

References to logic steps in FIG. 3 are simplified by neglecting to discuss hysteresis in all decisions where a component is to be activated at a particular temperature or ice fraction. Detailed logic in each such case provides hysteresis such that separate "on" and "off" temperatures or ice fraction values are specified to prevent "chattering" or rapid actuation/deactuation of the system. In all cases hysteresis is subtracted from the stated target, so that the compressor turns on at the "target minus hysteresis" value, and off at the target. For example, if storage target in heating mode is 120° F. and hysteresis is 5° F., the compressor will turn on at 115° F. and off at 120° F. storage temperatures. In cooling mode, if ice target is 50% and ice hysteresis is 10%, the compressor will turn on at 40% ice and off at 50% ice. For any operating mode, hysteresis does not change with system temperatures except in off-peak heating mode, as described subsequently with reference to FIG. 6. For other operating modes, typical hysteresis values have typically been established based on multiple computer simulations used to optimize performance, and are as follows:

DHW (on-peak & off-peak): 4° F.
Cooling (chilled water): 4° F.
Cooling (ice): 10%
Heating (on-peak): 3° F.

The liquid level check of step 302 is performed whenever water temperature ($T_{82}$) measured by temperature sensor 82 in tank 50 (refer to FIGS. 1 and 2) exceeds 45 degrees F. A description of the level sensor 81 is provided with reference to FIG. 13. The voltage reported to the control unit by the level sensor is directly converted to depth values. When reported depth is less than a lower limit value, the electric fill valve 58 is activated in step 302A to add approximately 0.125 inches of water to the tank. Both water addition by the fill valve 58 and conversion of water to ice on the tank heat exchange coils will result in increased readings by the level sensor. The 0.125 inch fill increment corresponds to conversion of approximately 4% of tank water to ice; 4% becomes the maximum error in sensed ice fraction.

Figure 7:
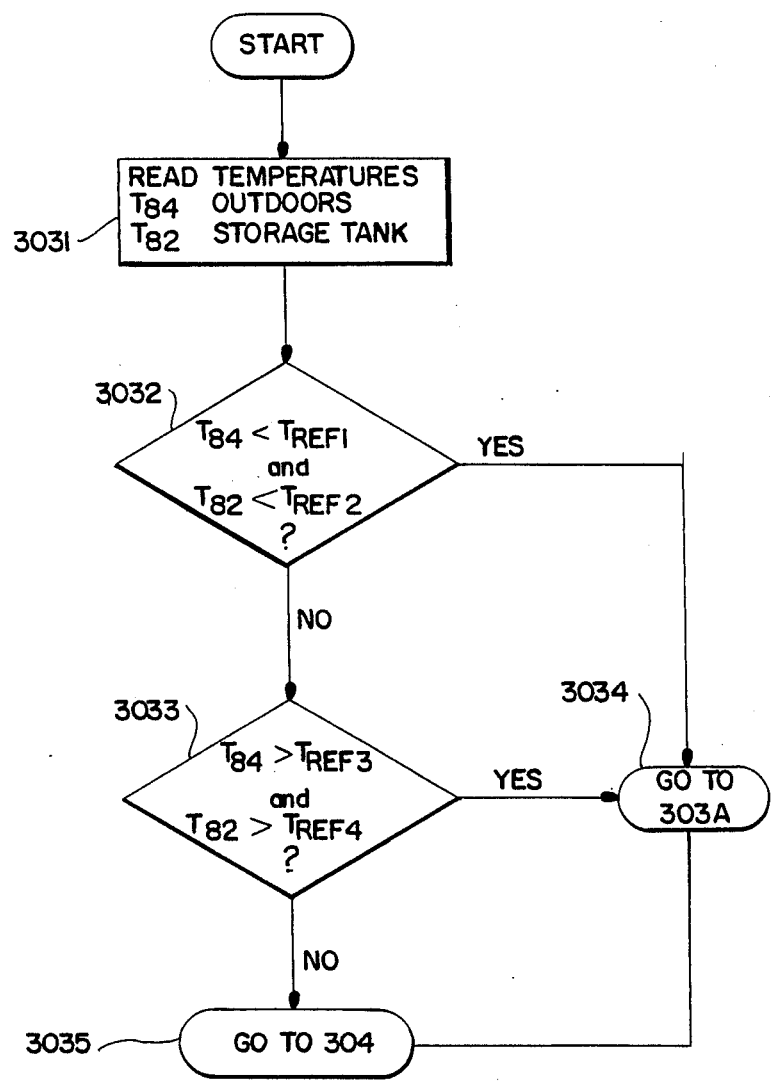
FIG. 7 is a flow chart illustrating control logic for seasonal interlocks to prevent improper delivery to building heat exchangers.

Logic which checks the need for fan coil pump lockout (step 303) is subsequently described with reference to FIG. 7, and operates switch 62 (step 303A) in the control circuit for pump 64 (see FIG. 1). Following the liquid level and pump interlock checks, the control system assigns a system operating mode (step 304), as subsequently described with reference to FIG. 4. If domestic water heating operation is specified, operating the compressor 10, reversing valve 30, domestic hot water three-way valve 54, and outdoor fan 41 (step 305A), an auxiliary check is performed to determine whether the outdoor fan should be interrupted for compressor protection, resulting in component operation shown in step 305C. Simplified logic for the fan check is provided in FIGS. 8, 9 and 10.

Figure 5:
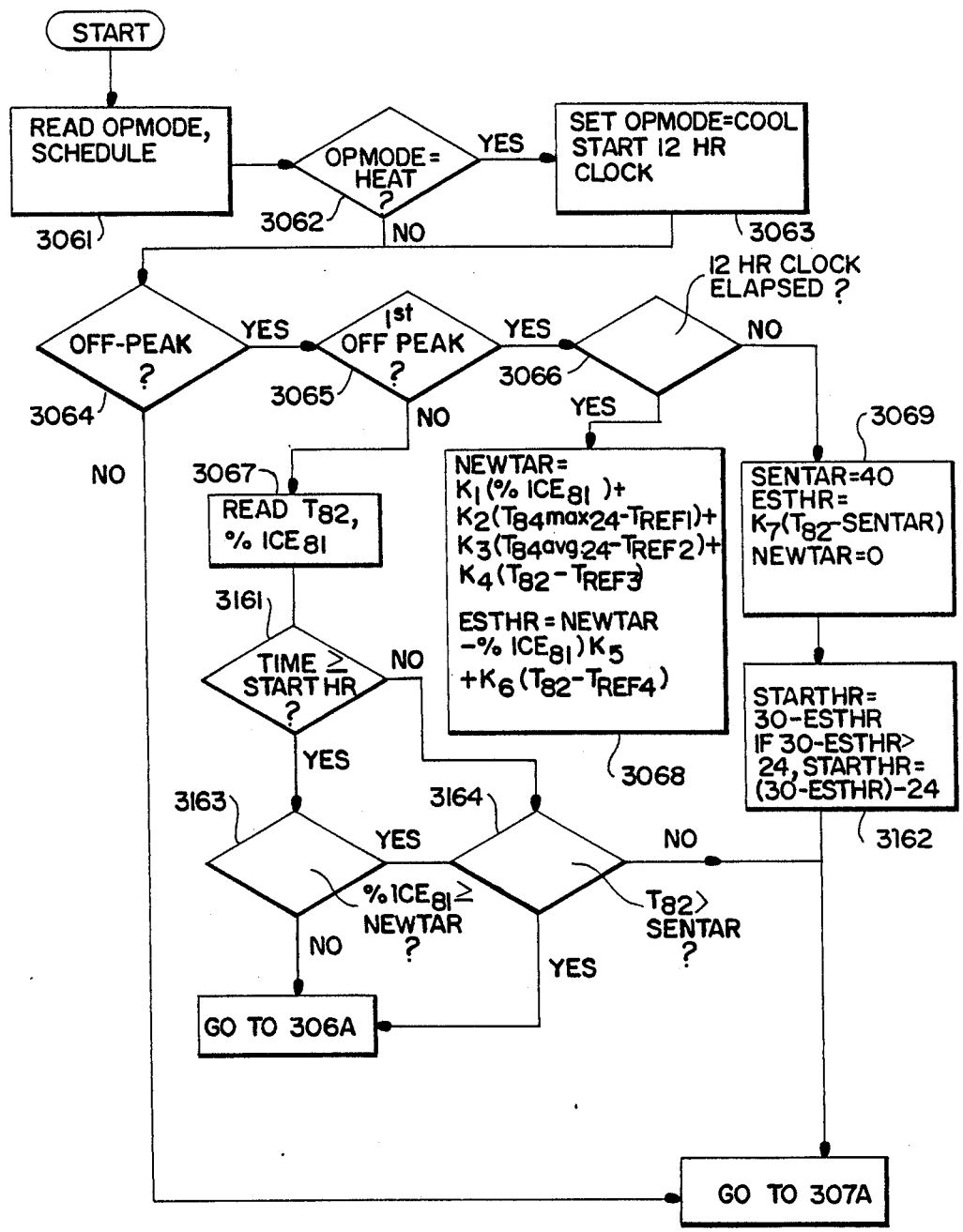
FIG. 5 is a flow chart illustrating control logic for the cooling mode.

If cooling mode is prescribed (step 306) and operation is thereby required according to logic provided in FIG. 5, the compressor 10, outdoor fan 41, and cooling valve 49 are activated (step 306A). If heating mode is prescribed (step 308) and operation is thereby required according to logic provided in FIG. 6, the compressor 10, outdoor fan 41, and reversing valve 30 are activated (step 308A). However, an auxiliary check is required (step 308B) to determine whether the outdoor coil requires defrosting, according to logic provided in FIG. 12; two alternate defrost modes are provided (steps 308C and 308D), with selection dependent on outdoor conditions.

Figure 11:
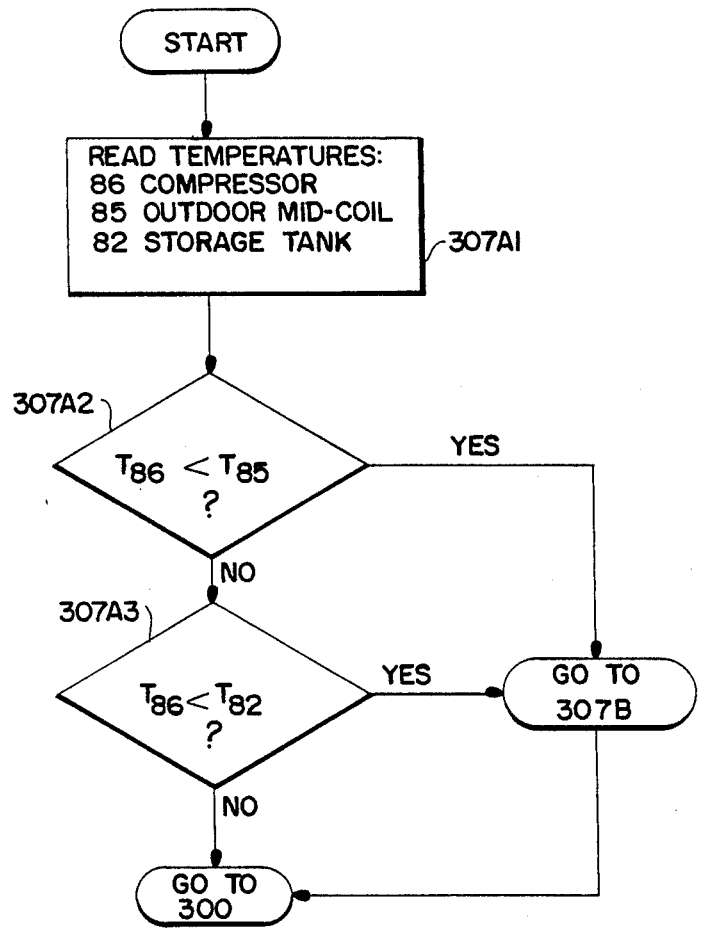
FIG. 11 is a flow chart illustrating control logic for compressor crankcase heater operation.

If "coast" mode (step 307) is dictated by average outdoor temperatures, or if no operation is required in heating or cooling mode, an auxiliary check may be required according to logic provided in FIG. 11 (step 307A) to activate the crankcase heater 13 (step 307B) for compressor protection. Crankcase heater energy is detrimental to system performance, and should be eliminated or minimized. Placing the compressor in an insulated enclosure with a domestic hot water storage tank is one strategy for elimination of the crankcase heater, but this strategy is not available in systems which do not provide domestic water heating.

Upon completion of each cycle through the logic loop, the program returns (step 300) and begins the next cycle with reading of clock and sensor inputs.

Each of the logic blocks of FIG. 3 will now be described in detail with reference to FIGS. 4–12 which outline the sequential logic steps.

Figure 4:
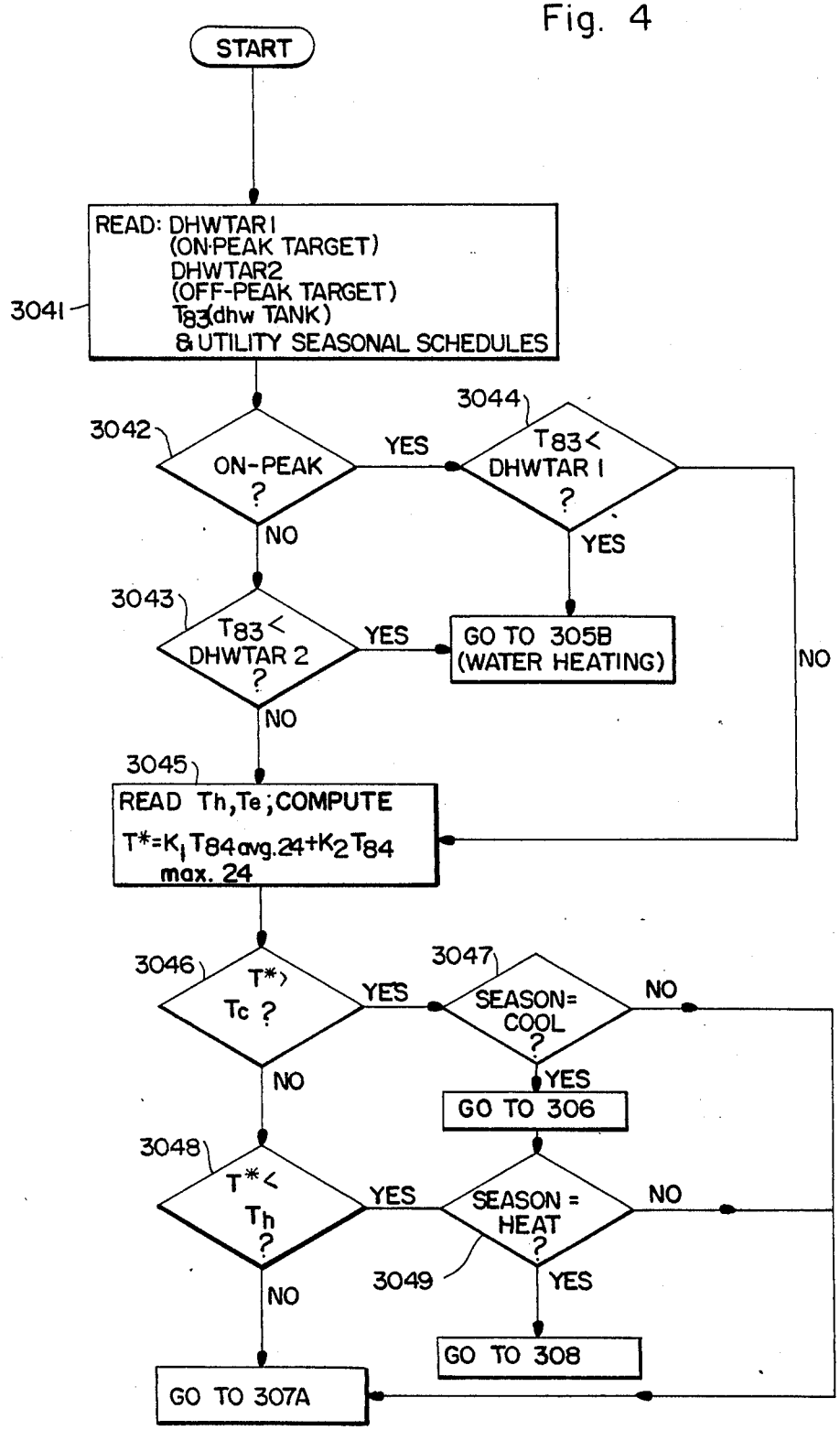
FIG. 4 is a flow chart illustrating control logic for selecting system operating mode.

FIG. 4 conveys simplified logic used to determine system operating mode and domestic hot water operating times (step 304). The program may enter the initial mode selection step (3041) from steps 301, 302A or 303A of FIG. 3. After recalling input domestic hot water target temperatures, measured DHW tank temperature $T_{83}$ (from sensor 83) and utility on-peak and off-peak schedule information, the program assesses whether current time is on-peak or off-peak (step 3042). Next, the program determines whether there is an immediate need for operation in the domestic water heating mode, which is given priority over space conditioning functions.

To minimize on-peak water heating operation, a higher target (DHWTAR2) is established for off-peak hours (step 3043) compared to the on-peak target DHWTAR1 (step 3044). By reaching a higher temperature off-peak, the system can satisfy substantial on-peak hot water demands without compressor operation. Typical targets are 128° F. off-peak and 125° F. on-peak, which values are read into the microprocessor controller 80 to initialize the values of DHWTAR1 and DHWTAR2. Target values are limited by condensing pressure limits imposed by the refrigerant; the preferred Freon-22 refrigerant is generally limited to a 130° F. condensing temperature. Domestic water storage quantity may be increased from the 40 gallons most typical for residential applications to 80 gallons, to compensate for lower than normal temperature. When measured DHW tank temperature $T_{83}$ from sensor 83 is below the appropriate target value, the domestic water cycle is activated (step 305B in FIG. 3). In some systems a short heating mode cycle may be required to control refrigerant volumes prior to entering the DHW mode.

The controller 80 then selects among heating, cooling and coast modes with respect to the main space conditioning tank (i.e., among steps 306, 307 or 308 in FIG.

3). For this purpose, the annual calendar is divided into four parts for heating, cooling and two overlap time periods. The system is prevented from functioning in the opposed operating mode in heating and cooling time periods, but may be in heating, cooling or coast mode during the overlap periods. Opposed operation is prevented during midwinter and mid-summer because reversing the large main storage tank incurs a substantial energy loss, and experience indicates that any unseasonal weather spell which might cause program logic to reverse the mode would be both welcome and short-lived; occupants would be unlikely really to need heating in mid-summer or cooling in mid-winter.

Selection of heating, cooling or coast mode is determined in steps 3045–3049 of FIG. 4 based on a parameter "T*" determined by the formula shown in step 3045 from the most recent 24 hour high and average outdoor temperatures $T_{84\ max.\ 24}$ and $T_{84}$ avg. 24, respectively. The gain adjustment factors $K_1$ and $K_2$ may be varied to affect the relative importance of the two temperatures; typical values are 0.6 and 0.4 for $K_1$ and $K_2$, respectively, to give 24 hour average temperature greater impact than maximum temperature on mode selection. Once computed, T* is compared to input switch point temperatures $T_h$ (step 3046) and $T_c$ (Step 3048) selected based on computer simulations aimed at minimizing operating costs while maintaining indoor comfort. When T* is above $T_c$, cooling mode is selected; below $T_h$, heating mode is selected. When T* is equal to either of or between $T_c$ and $T_h$, or if the opposed mode is selected in either non-overlap time period (steps 3047 and 3049), the system is placed in "coast" mode, which prevents the compressor from either heating or cooling the space conditioning tank. In coast mode (step 307 in FIG. 3), the controller may perform a crankcase heater check (step 307A in FIG. 3) before returning to restart the cycle.

Values for $T_h$ and $T_c$ will generally be chosen to create a bias toward cooling, since woodburning or electric resistance heat sources are often available but an auxiliary cooling source usually is not. Typical values are 70° F. and 73° F. for $T_h$ and $T_c$, respectively.

With the control system automatically determining the seasonal mode in step 304 of FIG. 3 using the logic of FIG. 4, the building thermostat could demand heating or cooling at a time when the space conditioning storage tank is in the wrong condition. A thermostat demand simply operates the fan coil pump 64 and indoor blower 61, bringing water, regardless of temperature, from the tank 50 to the indoor fan coil 60. Accordingly, a prevention mechanism or interlock should be provided to prevent a demand for heating when the tank 50 is operated for cooling, or a demand for cooling when the tank 50 is operated for heating. FIG. 7 illustrates logic for temperature interlocks designed to prevent counterproductive space conditioning operation using logic based on tank and outdoor temperatures (step 3031). The logic prevents water delivery to the heat exchange coil 68 by disabling the pump 64 via lockout switch 62 (step 3034) when both outdoor and tank temperatures $T_{84}$ and $T_{82}$ are low (step 3032) or when both are high (step 3033). Typical values are 60°, 70°, 70° and 70° F. for reference temperatures 1, 2, 3 and 4, respectively.

Figure 8:
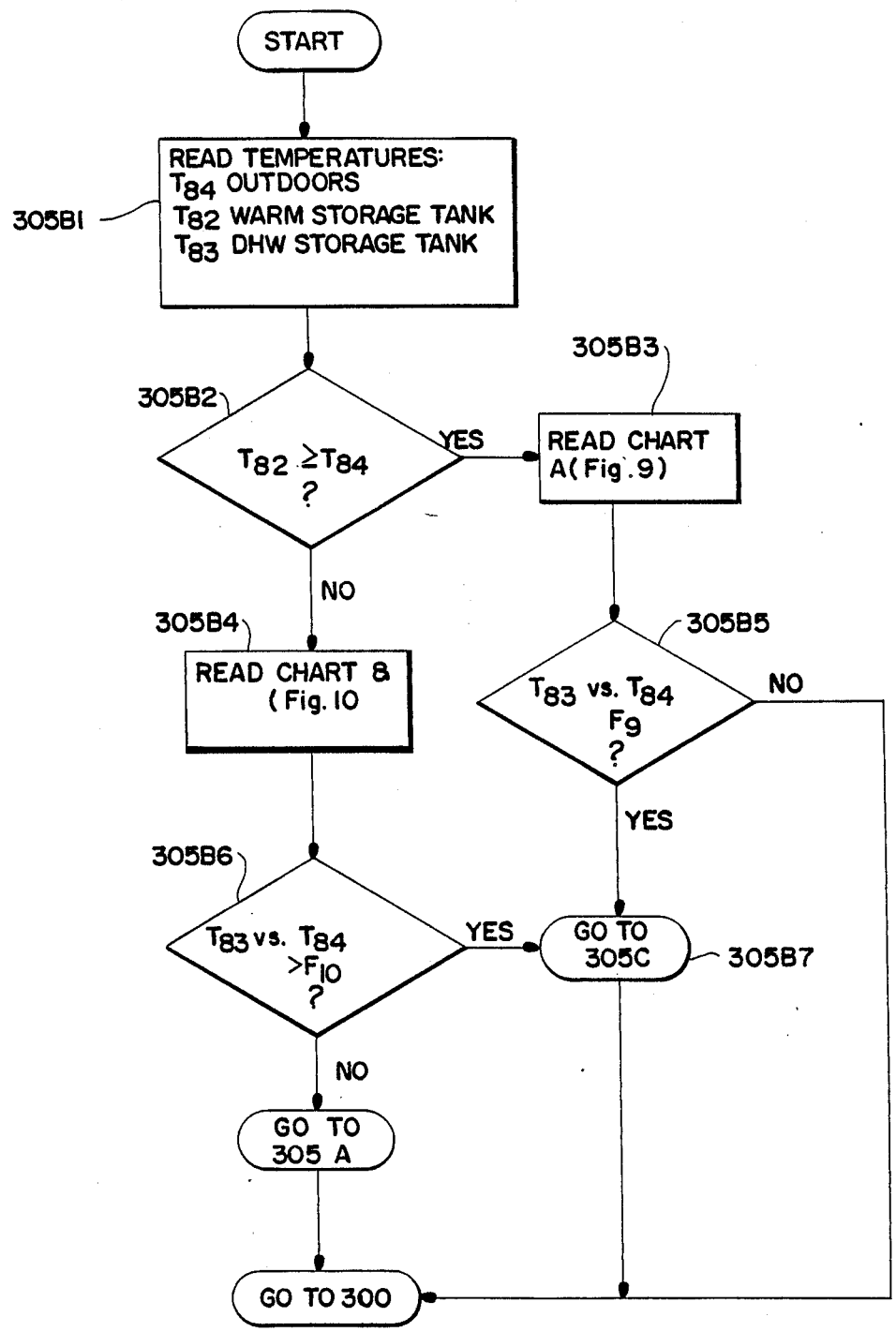
FIG. 8 is a flow chart illustrating control logic for outdoor fan interlock for compressor protection in domestic water heating operation.
Figure 9:
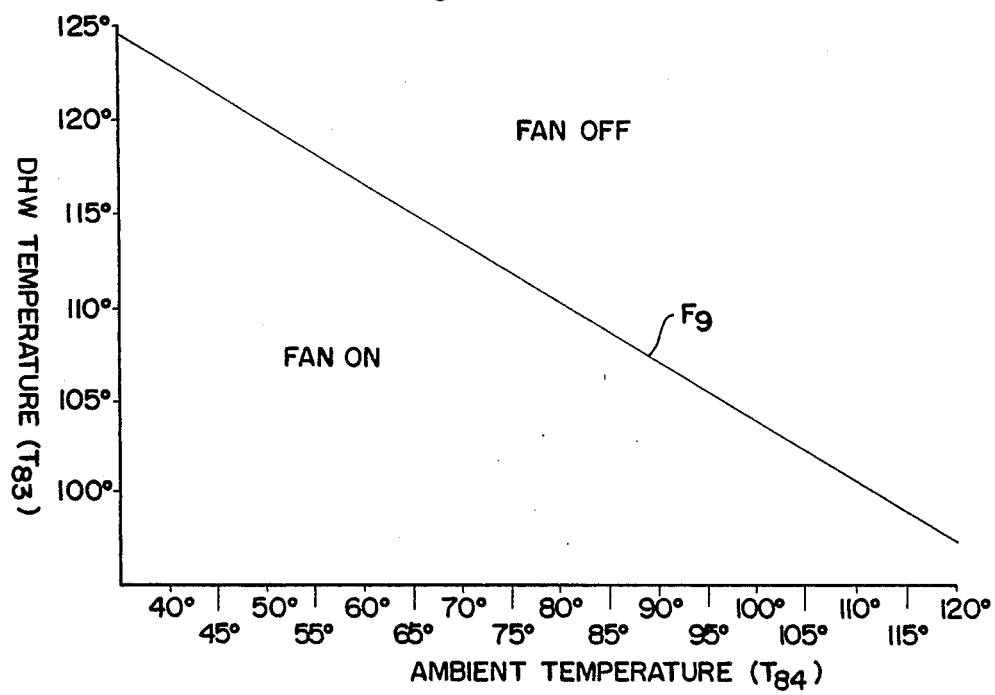
FIGS. 9 and 10 are graphs which illustrate temperature relationships used for outdoor fan interlock.
Figure 10:
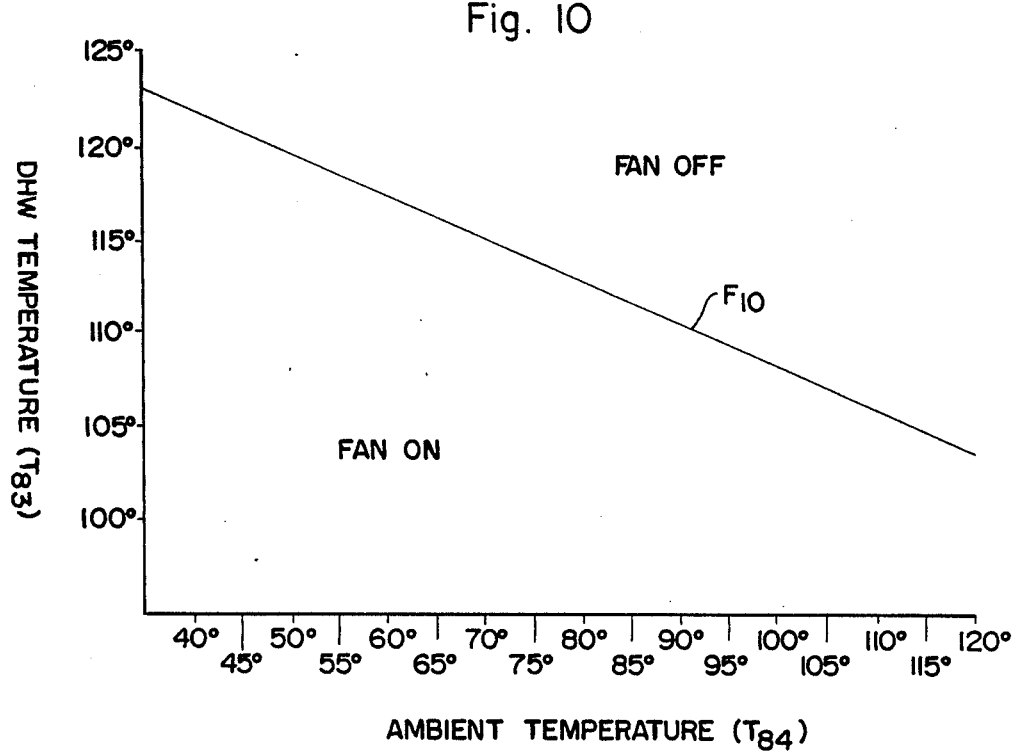

FIGS. 8, 9 and 10 present "fan off" logic designed for compressor protection. This feature is particularly necessary during system start up with domestic hot water temperature below normal targets. When outdoor air (the heat pump source in space and domestic water heating modes) is warm and the domestic hot water storage tank (the heat pump sink in water heating mode) is not hot, heat pump capacity increases and mechanical forces may overstress the compressor; the heat pump is operating in too favorable a condition. The preferred solution to this problem is to reduce the apparent source temperature by shutting off the outdoor fan 41.

FIG. 8 with further reference to FIGS. 9 and 10 provides logic for outdoor fan 41 interruption in the domestic water heating mode based on outdoor, main tank 50 and DHW tank 20 temperatures $T_{84}$, $T_{82}$ and $T_{83}$. One of two linear relationships (Step 305B3 or 305B4 in FIG. 8) is used based on whether main storage tank 50 temperature $T_{82}$ is above (step 305B3 and FIG. 9) or below (step 305B4 and FIG. 10) outdoor temperature $T_{84}$ (step 305B2). Each chart provides a negative-slope line separating "fan off" and "fan on" regions, with domestic hot water tank temperature $T_{83}$ plotted vs. outdoor temperature $T_{84}$. $T_{83}$ vs. $T_{84}$ is compared to the decision lines F9 and F10 in steps 305B5 and 305B6. The preferred logic will prevent fan operation (step 305B7) during most summer domestic water heating cycles while maintaining fan operation during cold weather on-peak operation.

FIG. 5 provides cooling mode logic (step 306 in FIG. 3) to determine whether the compressor 10 should operate to chill (or freeze) water in the main storage tank 50. Logic described here assumes that the RCTES system is sufficiently large to satisfy on-peak cooling demands without compressor operation. Systems with undersized storage may be controlled to operate a fixed percentage of each on-peak hour during peak conditions, but electric utility benefits are more difficult to guarantee in this "partial storage" scenario.

RCTES system cooling efficiency increases with decreasing outdoor temperature. Therefore, it is desirable to chill and/or freeze the storage medium during the coolest part of the night. However, continuous off-peak operation may be required during peak summer weather. The preferred cooling logic is designed to:

(1) estimate cooling demand for the subsequent daily cycle, and establish target storage conditions ("SENTAR" for chilled water temperature and "NEWTAR" for storage ice fraction);

(2) estimate required off-peak operating hours ("ESTHR"); and (3) select a start time for coolest outdoor operation ("STARTHR").

Cooling cycle planning begins at the end of each onpeak period or just before the first off-peak period, when the microprocessor 88 establishes its cooling target for the subsequent off-peak operating period. The target may be either a minimum chilled water temperature ("SENTAR") or a maximum ice fraction ("NEWTAR"). Relative importance of each term can be varied using gain adjustment/conversion factors determined from a computer model designed to minimize projected annual energy costs in a particular locale. The target cooling storage quantity is both increased with outdoor temperature and decreased with current storage condition. The current storage term allows the system to learn from past cycles; if a significant cooling storage quantity remains from the prior cycle, the next target will be slightly lowered.

FIG. 5 shows logic entered by the control program when cooling mode is selected in step 304 in FIG. 3.

After reading the most recent operating mode ("coast" is not considered to be an operating mode for this purpose) and utility schedule in step 3061, the program determines whether the past operating mode was heating (step 3062); if so, the operating mode is changed and a 12 hour clock is started in step 3063. During the 12 hour period, the cooling target will be set in the chilled water range and the system will not be allowed to store ice in the storage tank. This feature is provided to minimize the impact of tank switchover.

After checking prior mode, the program determines whether current time is on-peak or off-peak in step 3064. If onpeak, no compressor operation occurs and the program proceeds to step 307A (FIG. 3) for the crankcase heat check. If off-peak, step 3065 determines whether the system has just entered the offpeak period. If yes, the program determines in step 3066 whether the 12 hour timer started in step 3063 has elapsed. If it has, the program proceeds to its normal method for establishing the cooling target ice fraction ("NEWTAR") in step 3068. If not, the program proceeds to step 3069, which establishes a "sensible" target ("SENTAR", without ice) as introduced in the paragraph above. Step 3069 establishes a 0% ice value for NEWTAR, since SENTAR will only govern when NEWTAR is zero. A typical value for SENTAR is 40° F. Operating time for the off-peak cycle ("ESTHR") is also estimated in step 3069, as a constant $K_7$ times the difference between storage tank temperature $T_{82}$ and SENTAR. $K_7$ is a gain adjustment/conversion factor similar to $K_6$ (discussed below); a typical value for factor $K_7$ is 0.088.

Normal "ice target" (NEWTAR) computation in step 3068 is affected by the most recent 24 hour maximum and average outdoor temperatures $T_{84\,max.\,24}$ and $T_{84\,avg.\,24}$, and by current storage temperature ($T_{82}$) and ice fraction (% ICE). The three temperatures are compared to fixed reference temperature values $T_{REF1}$, $T_{REF2}$ and $T_{REF3}$ before multiplication by gain adjustment/conversion factors. Typical reference temperature values are $T_{REF1}=79°$ F., $T_{REF2}=66°$ F., and $T_{REF3}=55°$ F. Typical gain adjustment/conversion values are $K_1=-0.25$, $K_2=2.8$, $K_3=2.1$, and $K_4=0.1$. Operating time for the off-peak cycle ESTHR is also estimated in step 3068, based on a two-term equation in which the first term covers operating time building ice and the second term covers time spent reducing storage temperature to the freezing point. A typical reference temperature value $T_{REF4}$ is 32° F. Typical values for the gain adjustment/conversion factors $K_5$ and $K_6$ are 0.211 and 0.147, respectively.

After computing the target and estimating operating time in either step 3068 or 3069, the program computes a cycle start time in step 3162. The desired cycle completion time is established to be 6 AM based on computer optimization studies. Since the desired starting time may be either before or after midnight, its value is first calculated by subtracting estimated operating hours from 30 (24 hour day+6 AM finish time); if the result is more than 24, one 24 hour day is subtracted to establish a start time between midnight and 6 AM. After setting a start time, the program proceeds to the crankcase heat check (step 307A); if the computed start hour is prior to current time, operation will begin approximately six seconds later on the next control cycle, in accordance with logic beginning with step 3067. This step is entered from step 3065 on all but the first off-peak control cycle; the first cycle is always used only to establish the storage target.

After reading both ice and temperature storage conditions in step 3067, the controller compares actual time to desired start time ("STARTHR") in step 3161. If actual time is before desired start time, the program proceeds to step 3164 which compares storage water temperature $T_{82}$ with the sensible target, and commands compressor operation (step 306A in FIG. 3) if SENTAR has been exceeded. Thus, the system always seeks to maintain SENTAR as a minimum cool storage level during off-peak hours. If storage temperature is below SENTAR in step 3164, the controller proceeds to crankcase heater check step 307A (FIG. 3).

When step 3161 finds actual time to be after STARTHR, ice fraction % $ICE_{81}$ measured by sensor 81 is compared to NEWTAR in step 3163. When step 3163 finds ice fraction to be greater than or equal to NEWTAR, the sensible target check is again performed in step 3164 since the ice fraction and NEWTAR could both have been zero with chilled water temperature above SENTAR. When ice fraction is less than the target, step 3163 commands cooling operation via step 306A in FIG. 3; the program then proceeds via step 300 to begin the control loop again in step 301.

Figure 6:
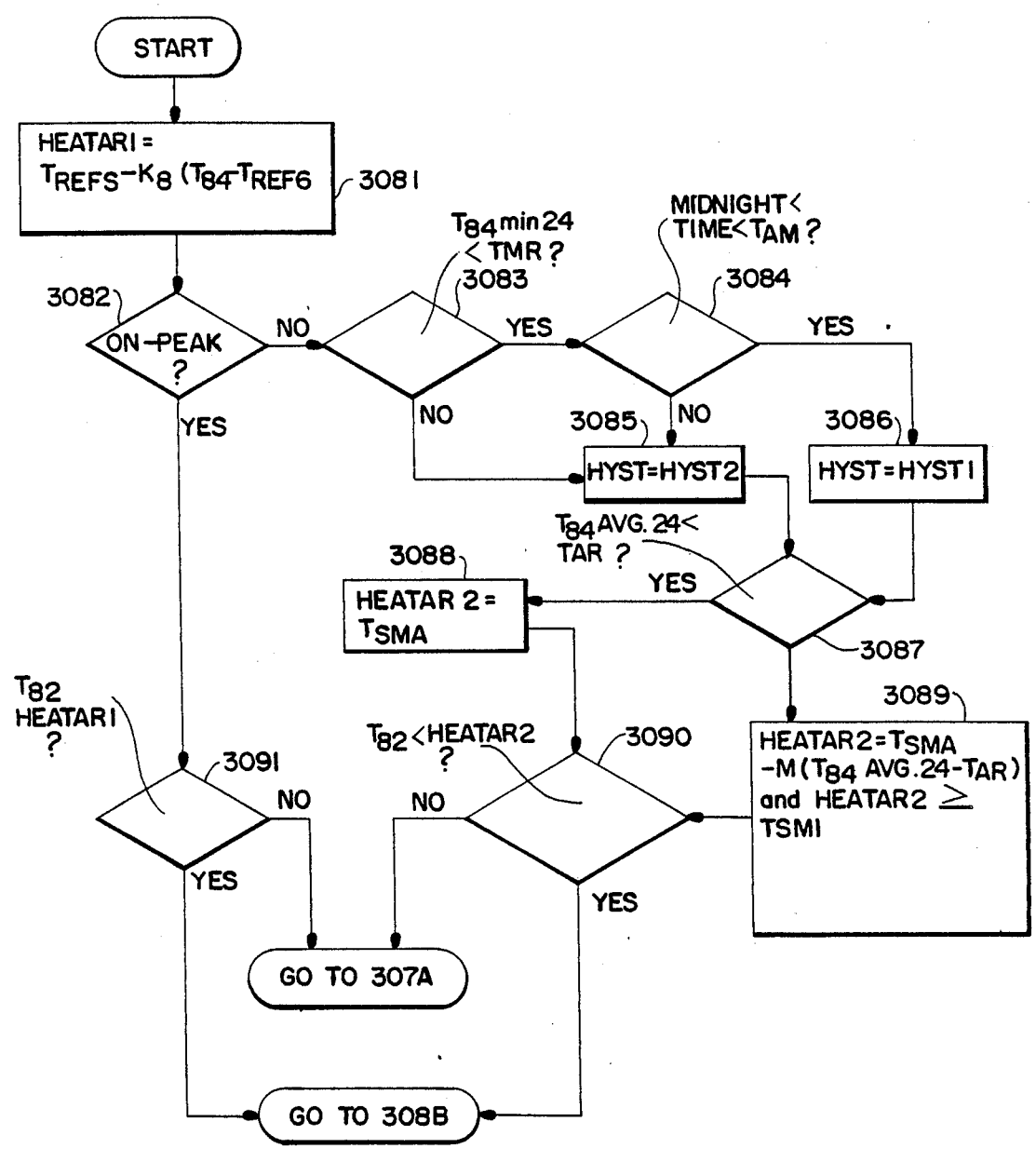
FIG. 6 is a flow chart illustrating control logic for the heating mode.

FIG. 6 provides heating mode logic (step 308 in FIG. 3) to determine whether the system should operate to heat water in the main storage tank 50. As with cooling mode, RCTES system heating efficiency is dependent on storage and outdoor temperatures $T_{82}$ and $T_{84}$. Both rising storage and falling outdoor temperatures adversely affect efficiency. Therefore, it is advantageous to develop control strategies which satisfy heating loads while minimizing storage temperature.

In heating mode, the RCTES system should be allowed to run on-peak because the alternative, if the storage tank 50 cannot supply necessary heating output, may be expensive and inefficient resistance electric heating 69 (on-peak) supplied at the indoor fan coil 60. In many climates where RCTES systems may be applied, the system will be less capable of operating fully offpeak in heating mode than in cooling mode if the latter has increased capacity due to phase-change (ice) storage; in these situations it may be particularly valuable to allow on-peak heating operation. Where allowed, on-peak operation must be minimized by intelligent microprocessor logic.

Preferred heating logic uses distinct target storage temperatures for each time period, with off-peak value greater than on-peak. The on-peak target is computed as a function of outdoor temperature $T_{84}$. The rationale for the on-peak target's dependence on outdoor temperature is that capacity of the indoor fan coil 60 which heats the building varies with water supply temperature from the tank 50, and required capacity increases as outdoor temperature falls. Thus, on-peak minimum storage temperature is maintained at a level slightly higher than required for heating at the current outdoor temperature.

The off-peak heating target logic is determined using a series of hourly computer simulations to identify strategies which minimize annual heating cost for each location and time-of-use utility rate structure. The preferred heating logic described here provides a structure in which many reference temperatures and time values may be changed for optimal control under local conditions. However, the same logic flow may generally be applied regardless of locale.

Computer simulations have shown that annual heating costs may typically be minimized by establishing the off-peak target at its maximum permissible value (limited by allowable "continuous duty" operating pressures for the refrigeration system) whenever the 24 hour average outdoor temperature is below a reference temperature. Above the reference temperature, it is prudent to begin reducing the off-peak target to reduce heat losses from storage, since the maximum storage quantity will not be required to satisfy heating loads. Below the reference temperature, annual heating costs are lower (due to reduced onpeak heating requirements) when maximum permissible storage temperature is the target.

Varying the on/off hysteresis range is also valuable to optimizing heating control. A large hysterisis range can increase average heat pump efficiency by causing longer operating cycles, which reduce the negative impact of start-up periods when the compressor is operating but the system is not delivering full heat output. Larger hysteresis also results in lower average storage temperatures (since hysteresis establishes an "on temperature" which is the final target value or "off temperature" minus the specified hysteresis value) which improve heat pump efficiency via lower average refrigerant condensing temperatures. However, lower average storage temperatures off-peak also mean reduced storage quantities, which can lead to increased on-peak heating operation.

In residential applications, morning heating demands are substantial because the building is often required to recover from a night thermostat setting, and considerable hot water use may occur. When a utility establishes a morning on-peak period, annual energy costs can be minimized if storage temperature entering the on-peak period is as near as possible to the off-peak target value; at these times, a small hysteresis value is preferred. At other times, including hours just prior to a later on-peak period, annual heating costs are minimized when controls are programmed for a larger hysteresis value.

The heating mode flow chart is provided in FIG. 6. After passing into heating mode from step 3049 of FIG. 4, the program computes an on-peak storage tank target temperature HEATAR1 in step 3081 which varies with outdoor temperature $T_{84}$. Typical values for on-peak target storage reference temperature $T_{REF5}$ and outdoor reference temperature $T_{REF6}$ are 95° F. and 35° F., respectively. A typical value for gain adjustment/conversion factor $K_8$ is 0.5. The program then proceeds to step 3091 to assess whether current time is on-peak. If it is, the program goes to step 3091 to determine whether storage tank temperature $T_{82}$ is below the on-peak target. If yes, control goes to step 308B for the defrost check before commanding heating mode operation; if not, control goes to step 307A to check the need for crankcase heater operation.

When step 3082 determines that current time is off-peak (i.e., not on-peak), the program goes to step 3083 to determine whether the 24 hour outdoor minimum temperature $T_{84min.24}$ is less than a fixed reference value $T_{MR}$ (typically 40° F). If it is, the program proceeds to step 3084 to determine whether the current time is between midnight and a specified morning time $T_{AM}$ (7 AM in a typical case) which may or may not be the start time for an on-peak period. If it is, the program proceeds to step 3086 where hysteresis (HYST) is set at its lower value HYST 1 (typically 5° F.). Since the compressor is activated when storage temperature is less than its current target by the hysteresis value, a smaller hysteresis value causes average storage temperature to be higher prior to start of the on-peak period than does a larger hysteresis value.

If step 3084 determines that current time is during an off-peak period (from step 3082) which is not between midnight and $T_{AM}$, the program proceeds to step 3085 where the larger hysteresis value HYST 2 is assigned (typically 9° F). From either step 3085 or 3086, control goes to step 3087 which determines whether 24 hour average outdoor temperature $T_{84avg24}$ is less than a fixed reference value $T_{AR}$ (typically 47° F). If it is, the program sets the off-peak target temperature HEATAR2 at its maximum value $T_{SMA}$ (typically 125° F.) in step 3088. If $T_{84avg.24}$ is greater than or equal to $T_{AR}$ in step 3087, logic goes to step 3089 which linearly reduces HEATAR2 below its maximum value as 24 hour average outdoor temperature increases from $T_{AR}$.

Slope M for the linear relationship in step 3089 may be determined such that the heating target storage temperature HEATAR2 varies between its maximum value $T_{SMA}$ (where $T_{AR} = T_{84\ avg.24}$) and a lower value sufficient to satisfy heating loads in the mildest heating season weather. A typical value for the slope M is 2.5. Step 3089 also enforces a minimum value $T_{SMI}$ for HEATAR2; a typical $T_{SMI}$ value is 90° F. After HEATAR2 is established in either step 3088 or 3089, control proceeds to step 3090 which assesses whether storage temperature $T_{82}$ is below HEATAR2. If it is, control proceeds to step 308B for the defrost check before commanding heating mode operation. If not, control proceeds to step 307A to check the need for crankcase heater operation.

When either coast mode is assigned or no operation is required in cooling or heating mode, the need for compressor crankcase heating should be checked (if crankcase heat is provided) according to logic illustrated in FIG. 11. Crankcase heat may be necessary to prevent refrigerant from condensing in the compressor at times when the compressor is the coldest component in the refrigeration system (the compressor may be damaged by attempting to compress liquid refrigerant). Either the outdoor coil 44 or the main storage tank heat exchanger 51 may become warmer than the compressor during off-cycles. Temperature sensors 85, 82 and 86 are provided at the outdoor coil 44, main tank 50, and compressor crankcase 10, respectively. Microprocessor logic activates the crankcase heater 13 whenever the compressor case is colder than either of the other two components.

A flow chart for the compressor crankcase heater control logic is provided as FIG. 11. The program arrives at step 307A1 from step 306, 307 or 308, and reads compressor, outdoor mid-coil and storage tank temperatures $T_{86}$, $T_{85}$ and $T_{82}$ before proceeding to step 307A2 in which compressor crankcase temperature is compared to outdoor mid-coil temperature. Thus, if crankcase temperature is nearly as low as outdoor mid-coil temperature, the program proceeds to step 307B to turn on the crankcase heater. If not, the logic proceeds to step 307A3 to compare crankcase temperature to storage temperature. If the crankcase is nearly as cool as storage, the program goes to step 307B for crankcase heater operation; if not, it goes to step 300 to restart the control cycle.

Figure 12:
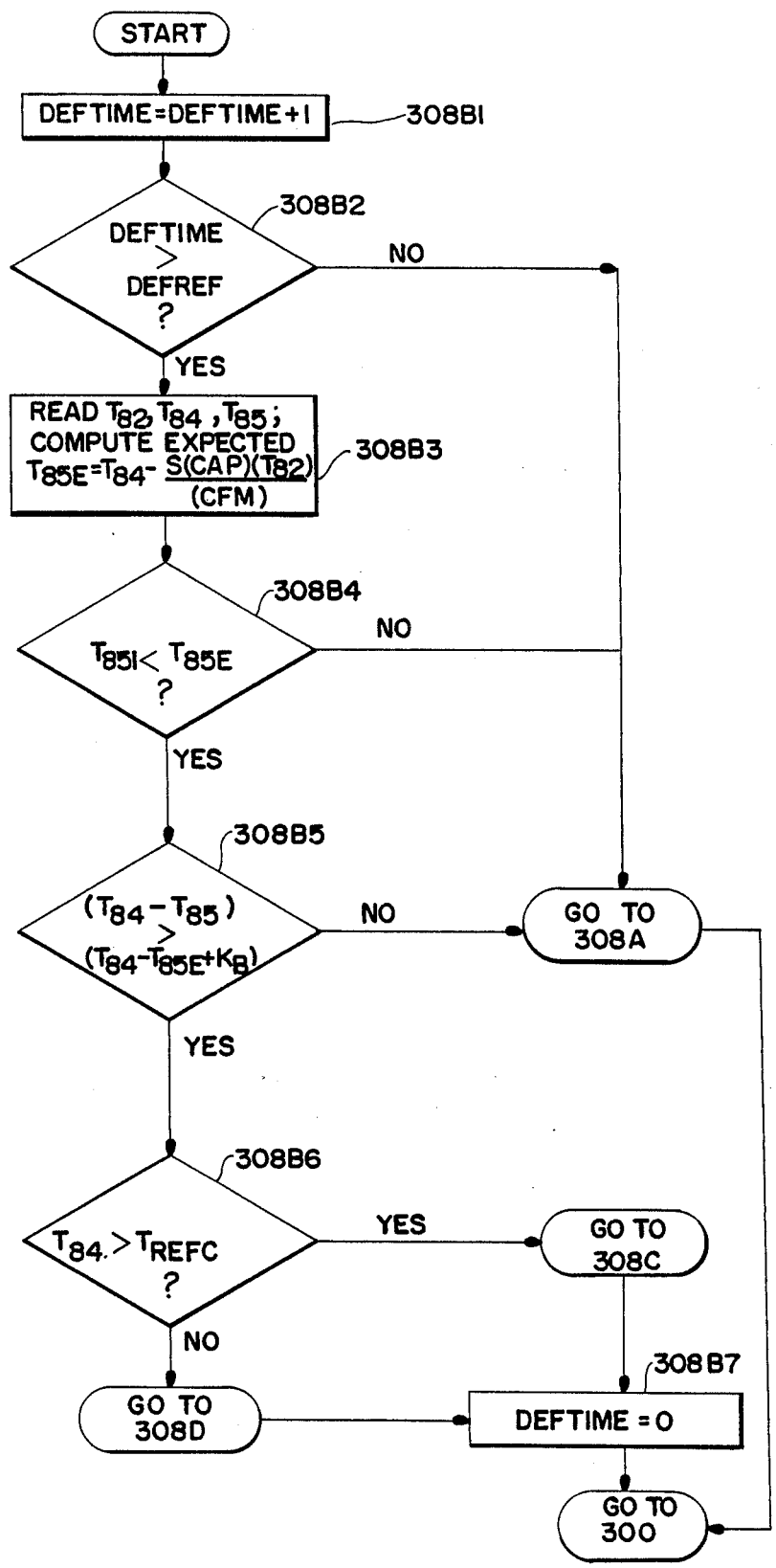
FIG. 12 is a flow chart illustrating control logic for defrost operation.

FIG. 12 illustrates auxiliary heating mode logic for defrost operation. A defrost cycle is necessary during moist outdoor conditions because the outdoor coil 44, serving as the system evaporator, often develops subfreezing surface temperatures to extract heat from outdoor air, whose moisture will condense and freeze on the coil. Substantial frost accumulation can block coil airflow, degrading system performance. Various strategies are available for removing frost from the coil; one technique for non-storage heat pumps is to reverse to the cooling cycle, extracting heat from indoor air to heat and defrost the outdoor coil on a fixed time interval (usually either 30 or 90 minutes) when outdoor temperature is below 45 degrees F. Reversed cooling operation is usually continued until the outdoor coil has risen to a fixed temperature in the 55 to 75 degree F. range. With the reversing strategy, resistance electric heat must be applied at the indoor coil to counteract cooling and maintain comfort. Also, timer-initiation can cause unnecessary defrost cycles.

RCTES systems can operate with reduced defrost energy penalties because reverse cycle cooling may be used to remove outdoor coil frost without simultaneously cooling the building. Also, the simpler defrost alternative (which works adequately in mild weather) of simply deactivating the reversing valve and turning the compressor off, allowing hot gas from the tank coil to enter the outdoor coil, is more feasible for RCTES than conventional systems because the RCTES tank can be satisfying building heating demands while the compressor is de-activated.

The preferred RCTES defrost strategy shown in FIG. 12 takes advantage of microprocessor intelligence to eliminate unnecessary defrost cycles by activating defrost only when sensed temperatures indicate that frost blockage of the outdoor coil 44 has occurred. The logic uses main tank and outdoor air temperatures in conjunction with a known "clean coil" outdoor air flow rate to estimate air temperature leaving the coil. A lower than expected temperature read by the mid-coil sensor indicates a low air flow rate and coil blockage. When the microprocessor determines that a defrost cycle is needed, an outdoor temperature check is used to select between "shutdown" and "reverse-cycle" defrost modes. When outdoor temperature is at or above approximately 40° F., the more energy-conserving shutdown mode is preferred; below this temperature, a reverse-cycle defrost mode is necessary. Reversal to heating mode occurs when the controller determines that mid-coil temperature has risen to a value indicating that frost has been removed.

FIG. 12, whose logic is entered from step 308, begins with incrementing of the defrost timer in step 308B1, followed by comparison of timer reading vs. a reference in step 308B2. This step is required to allow enough heating operation for the midcoil temperature to reach a "steady-state" value before comparing to an expected value. If the timer value is greater than the reference (typically 20 minutes), control proceeds to the defrost check, starting with reading of outdoor, storage and outdoor midcoil temperatures $T_{84}$, $T_{82}$ and $T_{85}$ and computation of an expected mid-coil temperature $T_{85E}$ in step 308B3. If not, control passes to step 308A for normal heating operation. $T_{85E}$ is estimated by subtracting from outdoor temperature $T_{84}$ the quotient of rated heat pump capacity CAP (at 40° F), outdoor temperature $T_{82}$ and measured tank temperature over outdoor fan nominal CFM, multiplied by a constant S.

S is a gain adjustment/conversion factor describing the limiting relationship between evaporator coil capacity at the heat pump operating condition and expected temperature drop across the outdoor (evaporator) coil in heating mode. Since temperature drop equal coil capacity divided by 1.08 times air flow rate in cubic feet per minute (CFM), and evaporator coil capacity in heating mode is typically about 60% of heat pump heating capacity, temperature drop across the coil should be about 0.65° F. times capacity divided by CFM with no frost on the coil. Thus, when a typical value S=1.3 is specified, the frost cycle is initiated when air flow rate has dropped to 50% of its unfrosted value. Preferred values of S will range from 1.0 to 2.0, and value selection will depend on results of optimization studies.

Actual and expected outdoor mid-coil temperatures are then compared in step 308B4. If actual temperature is less than expected, defrost is assumed to be necessary and logic proceeds to step 308B5. If not, the program continues in heating mode by proceeding to step 308A. In step 308B5, the program determines whether the air temperature drop through the outdoor coil (outdoor minus mid-coil) is greater than expected. The constant adjustment "$K_B$" allows correction for mid-coil sensor location. If the temperature drop is not greater than expected, the system continues in heating mode via step 308A; if it is greater than expected, the program procees to step 308B6. In this step, outdoor temperature is compared to a reference temperature $T_{REFC}$; if greater, the "stage 1" defrost mode is selected in which the fan and reversing valve are operated but the compressor is not. Termination of this mode (not shown in FIG. 12) occurs after a fixed compressor shutdown time period (typically 15 minutes).

When outdoor temperature is less than the reference temperature (typically 40° F.), the program commands "stage 2" defrost which utilizes reverse-cycle heating of the outdoor coil via step 308D, in which the outdoor fan is not operated. Termination of this mode (also not shown in FIG. 12) occurs when mid-coil temperature has risen to a preset temperature (typically 70° F.). When either defrost mode terminates, the defrost time is reset to zero in step 308B7.

Figure 13:
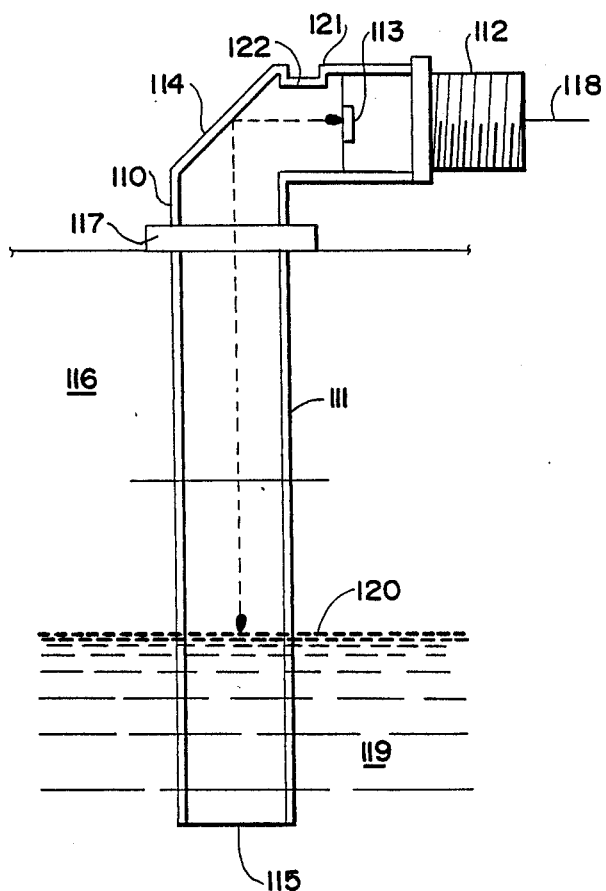
FIG. 13 is a cross-sectional view of a preferred embodiment of the liquid depth sensor for an ice/water RCTES storage container.

FIG. 13 illustrates an advantageous water level sensor component for the optimal RCTES control system. Water level sensing is necessary to control automatic refill of non-pressurized tanks, and to determine "ice percentage" for ice/water tanks. Ice percentage may most easily be determined by measuring depth increase due to ice formation (depth increases with ice percentage due to lower density of ice vs. water). While a float with vertical rod driving a linear potentiometer may be used to generate a linear voltage output with depth, a sensor without moving parts is preferred from a reliability standpoint. Depth sensor 110 illustrated in FIG. 13 eliminates moving parts through use of ultrasonic proximity sensor 112.

Sensor assembly 110 is comprised of vertical tube 111 and horizontal tube 121 connected by an angled surface 114. An ultrasonic sensor 112 is located in the horizontal tube 121, and a shoulder 117 is provided on the vertical tube 111. The assembly is inserted through a receiving hole in insulated storage tank lid 116, such that shoulder 117 rests on lid 116 and lower end 115 of tube 111 is below upper level 120 of general water volume 119. An ultrasonic ray is projected horizontally from lens 113 of sensor 112 and is reflected to a vertical path by 45 degree angle surface 114. The ray is reflected from the water surface, following the same path back to sensor lens 113. Sensor 112 generates an output voltage which is proportional to the ray's total travel distance.

The horizontal-to-vertical ray transition is provided to prevent fogging of the sensor lens. Opening 122 is provided in the top of horizontal tube 121 to allow water vapor to escape without condensing on lens 113, where it might cause erroneous readings. Sensor assembly 110 may be secured in place either with adhesive located between shoulder 117 and lid 116, or with screws (not shown) driven through shoulder 117 into lid 116. Conductor wire 118 brings low voltage to the sensor and conveys the variable output voltage to the input processor.

Although the optimal RCTES control system of the present invention has been described in connection with the preferred embodiment thereof, it will be appreciated by those skilled in the art that additions, modifications, substitutions and deletions not specifically described may be made without departing from the spirit and scope of the invention defined in the appended claims. For example, level sensor assembly 110 may be replaced with a float-type or other non-contact depth-sensing device. Other changes are also possible.

The principles, preferred embodiments and modes of operation of the present invention have been described in the foregoing specification. The invention which is intended to be protected herein, however, is not to be construed as limited to the particular forms disclosed, since these are regarded as illustrative rather than restrictive. Various changes may be made by those skilled in the art without departing from the spirit of the invention.

What is claimed is:

1. A method of controlling both the heating and cooling modes of a refrigeration-coupled thermal energy storage system, the control method comprising the steps of:
   selecting between the heating and cooling modes based upon outdoor temperature history;
   establishing target cooling and heating storage conditions based upon outdoor temperature history;
   operating the system in the cooling mode, when selected, until the target cooling storage condition is achieved, such that cooling storage quantity increases with increases in outdoor temperature; and
   operating the system in the heating mode, when selected, until the target heating storage condition is achieved, such that heating storage quantity increases with decreases in outdoor temperature.

2. The method of claim 1, further comprising the steps of:
   calculating a mode selection trigger value ($T^*$) based upon outdoor temperature history;
   comparing the trigger value to first and second predetermined switch point temperatures ($T_c$, $T_h$), the first switch point temperature being greater than the second;
   selecting the cooling mode of operation if the trigger value exceeds the first switch point temperature and it is determined to be the cooling season; and
   selecting the heating mode of operation if the trigger value is less than the second switch point temperature and it is determined to be the heating season.

3. The method of claim 2, further comprising the step of selecting neither the cooling mode nor the heating mode of operation if the trigger value is equal to either the first or second switch point temperature, if the trigger value is between the first and second switch point temperatures, if the trigger value exceeds the first switch point temperature but it is determined to be the heating season, or if the trigger value is less than the second switch point temperature but it is determined to be the cooling season.

4. The method of claim 2, wherein the trigger value is based upon average and maximum outdoor temperatures for the most recent period of predetermined duration.

5. The method of claim 4, wherein the trigger value is calculated according to the formula:

$$T^* = K_1 T_{84\ avg.\ 24} + K_2 T_{84\ max.\ 24}$$

where $T^*$ is the trigger value, $T_{84\ avg.\ 24}$ and $T_{84\ max.\ 24}$ are the most recent 24 hour average and maximum outdoor temperatures, respectively, and $K_1$ and $K_2$ are gain adjustment/conversion factors.

6. The method of claim 1, wherein the cooling mode is controlled in accordance with the following steps:
   determining whether current time is within an on-peak period or an off-peak period in accordance with a current utility schedule;
   establishing an off-peak target storage ice fraction (NEWTAR) based upon outdoor temperature history, current storage temperature and current storage ice fraction; determining a necessary off-peak cooling cycle time (ESTHR) for achieving the off-peak target storage ice fraction; and determining a necessary off-peak cooling cycle starting time (STARTHR) for achieving the off-peak target storage ice fraction during the coolest portion of the off-peak period and by a predetermined off-peak time; and
   operating the system in the cooling mode if current time is at or after the off-peak cooling cycle starting time and if the current storage ice fraction is less than the off-peak target storage ice fraction.

7. The method of claim 6, wherein system operation in the cooling mode is prevented during the on-peak period.

8. The method of claim 6, wherein the value of the off-peak target storage ice fraction is increased with decreases in current storage ice fraction or increases in current storage temperature, and the value of the off-peak target storage ice fraction is decreased with increases in current storage ice fraction or decreases in current storage temperature.

9. The method of claim 6, wherein the value of the off-peak target storage ice fraction is based upon average and maximum outdoor temperatures for the most recent period of predetermined duration.

10. The method of claim 9, wherein the value of the off-peak target storage ice fraction is increased if either said average or said maximum outdoor temperature has increased, and the value of the off-peak target storage ice fraction is decreased if either said average or said maximum outdoor temperature has decreased.

11. The method of claim 9, wherein the value of the off-peak target storage ice fraction is calculated according to the formula:

$$NEWTAR = K_1(\% ICE_{81}) + K_2(T_{84\ max.\ 24} - T_{REF1}) + K_3(T_{84\ avg.\ 24} - T_{REF2}) + K_4(T_{82} - T_{REF3})$$

where NEWTAR is the off-peak target storage ice fraction, $\% ICE_{81}$ is the current storage ice fraction, $T_{84\ max\ 24}$ and $T_{84\ avg.\ 24}$ are the most recent 24 hour maximum and average outdoor temperatures, respectively, $T_{82}$ is the current storage temperature, $T_{REF1}$ through $T_{REF3}$ are reference values for 24 hour maximum and average outdoor temperatures and storage temperature, respectively, and $K_1$ through $K_4$ are gain adjustment/conversion factors.

12. The method of claim 11, wherein the off-peak cooling cycle time and the off-peak cooling cycle starting time are calculated according to the formulas:
   (1) $ESTHR = K_5(NEWTAR - \%ICE_{81}) + K_6 (T_{82} - T_{REF4})$, where ESTHR is the off-peak cooling cycle time, $T_{REF4}$ is a reference value for storage temperature, and $K_5$ and $K_6$ are gain adjustment/conversion factors;
   (2) $STARTHR = 30 - ESTHR$, where STARTHR is the offpeak cooling cycle starting time; and
   (3) $STARTHR = (30 - ESTHR) - 24$, where $30 - ESTHR$ is greater than 24.

13. The method of claim 6, further comprising the steps of:
   establishing an off-peak target storage temperature (SENTAR); and
   operating the system in the cooling mode during the off-peak period if the current storage temperature exceeds the off-peak target storage temperature even if current time is before the off-peak cooling cycle starting time or current storage ice fraction is greater than or equal to the off-peak target storage ice fraction.

14. The method of claim 6, further comprising the steps of:
   detecting an initial presence of storage ice with a storage temperature sensor; and
   detecting the storage ice fraction with a storage ice/water depth measuring device.

15. The method of claim 1, wherein the heating mode is controlled in accordance with the following steps:
   determining whether current time is within an on-peak period or an off-peak period in accordance with a current utility schedule;
   establishing an off-peak target storage temperature (HEATAR 2) based upon outdoor temperature history; and
   operating the system in the heating mode during the off-peak period if current storage temperature is less than the off-peak target storage temperature.

16. The method of claim 15, wherein system operation in the heating mode is prevented during the on-peak period.

17. The method of claim 15, wherein the value of the off-peak target storage temperature is based upon average outdoor temperature for the most recent period of predetermined duration.

18. The method of claim 17, wherein the off-peak target storage temperature is increased if said average outdoor temperature has decreased, and the off-peak target storage temperature is decreased if said average outdoor temperature has increased.

19. The method of claim 15, further comprising the steps of:
   establishing a hysteresis component at a value which is based upon outdoor temperature history and current time; and
   commencing operation of the system in the heating mode during the off-peak period when current storage temperature is less than the off-peak target storage temperature by an amount equal to said value of said hysteresis component.

20. The method of claim 15, further comprising the steps of:
   determining whether a most recent 24 hour minimum outdoor temperature is less than a reference value, and whether current time is between midnight and a predetermined morning time;
   establishing a hysteresis component at a first value if the most recent 24 hour minimum outdoor temperature is less than said reference value and current time is between midnight and said predetermined morning time, and commencing operation of the system in the heating mode during the off-peak period when current storage temperature is less than the off-peak target storage temperature by an amount equal to said first value of said hysteresis component; and
   establishing said hysteresis component at a second value, which is larger than said first value, if the most recent 24 hour minimum outdoor temperature is not less than said reference value or current time is not between midnight and said predetermined morning time, and commencing operation of the system in the heating mode during the off-peak period when current storage temperature is less than the off-peak target storage temperature by an amount equal to said second value of said hysteresis component.

21. The method of claim 15, further comprising the steps of:
   establishing an on-peak target storage temperature (HEATAR 1) based upon current outdoor temperature; and
   operating the system in the heating mode during the on-peak period if current storage temperature is less than the on-peak target storage temperature.

22. The method of claim 21, wherein the on-peak target storage temperature increases as current outdoor temperature decreases, and the on-peak target storage temperature decreases as current outdoor temperature increases.

23. The method of claim 21, wherein the on-peak and off-peak target storage temperatures are calculated according to the formulas:
   (1) $HEATAR\ 1 = T_{REF5} K_8 (T_{84} - T_{REF6})$;
   (2) $HEATAR\ 2 = T_{SMA}$ (if $T_{84\ avg.\ 24} < T_{AR}$); and
   (3) $HEATAR\ 2 = T_{SMA} - M (T_{84\ avg.\ 24} - T_{AR})$, but not less than $T_{SMI}$ (if $T_{84\ avg.\ 24} \geq T_{AR}$)
where HEATAR 1 and HEATAR 2 are respectively the on-peak and off-peak target storage temperatures, $T_{84}$ is the current outdoor temperature, $T_{84\ avg.\ 24}$ is the most recent 24 hour average outdoor temperature, $T_{REF5}$ and $T_{REF6}$ are reference values for on-peak target storage temperature and outdoor temperature, respectively, $T_{SMA}$ and $T_{SMI}$ are maximum and minimum off-peak target storage temperatures, respectively, $T_{AR}$ is a reference value for 24 hour average outdoor temperature, and M is a gain adjustment/conversion factor.

24. The method of claim 1, further comprising the steps of:
   detecting the level of storage liquid with a depth measuring device; and
   activating an automatic storage tank refill valve when the depth measuring device determines storage liquid depth to be below a predetermined level.

25. The method of claim 1, further comprising the step of preventing delivery of storage liquid to a building heat exchanger when outdoor temperature is below a first predetermined value and storage liquid temperature is below a second predetermined value, or when outdoor temperature exceeds a third predetermined value and storage liquid temperature exceeds a fourth predetermined value.

26. The method of claim 1, further comprising the steps of:
   determining whether current time is within an on-peak period or an off-peak period in accordance with a current utility schedule;
   operating the system during the on-peak period to produce domestic hot water if current domestic hot water tank temperature is less than a first predetermined value( DHWTAR 1); and
   operating the system during the off-peak period to produce domestic hot water if current domestic hot water tank temperature is less than a second predetermined value (DHWTAR 2), the second value being greater than the first.

27. The method of claim 26, wherein domestic hot water production is given priority over space conditioning functions.

28. The method of claim 26, further comprising the steps of operating the system to produce domestic hot water without operation of an outdoor heat exchanger fan when current domestic hot water tank temperature is greater than a third predetermined value which decreases continuously as outdoor temperature increases.

29. The method of claim 28, wherein one value is utilized as said third predetermined value when current storage temperature is greater than or equal to current outdoor temperature, and another value is utilized as said third predetermined value when current storage temperature is below current outdoor temperature.

30. The method of claim 1, comprising the further step of activating a compressor crankcase heater when current compressor temperature is lower than one of current storage temperature and current outdoor heat exchanger coil temperature.

31. The method of claim 1, further comprising the steps of:
   defrosting an outdoor heat exchanger coil during said heating mode of operation in accordance with a first defrost mode when current outdoor temperature exceeds a predetermined value, and in accordance with a second defrost mode when current outdoor temperature is equal to or less than said predetermined value.

32. The method of claim 31, further comprising the steps of:
   defrosting in said first defrost mode by deactivating a compressor while operating an outdoor heat exchanger fan and a system cooling valve to permit hot refrigerant to flow into the outdoor heat exchanger coil; and
   defrosting in said second defrost mode by operating the system in cooling mode with the outdoor heat exchanger fan deactivated.

33. A control apparatus for a refrigeration-coupled thermal energy storage system, the control apparatus comprising:
   sensors for measuring outdoor and storage temperatures;
   a calendar and clock;
   means for storing the outdoor and storage temperatures;
   means for selecting between heating and cooling modes based upon outdoor temperature history;
   means for establishing target cooling and heating storage conditions based upon outdoor temperature history; and
   means for controlling the system so as to operate in the cooling mode, when selected, until the target cooling storage condition is achieved, such that cooling storage quantity increases with increases in outdoor temperature, and so as to operate in the heating mode, when selected, until the target heating storage condition is achieved, such that heating storage quantity increases with decreases in outdoor temperature.

34. The control apparatus of claim 33, wherein said selecting means calculates a mode selection trigger value (T*) based upon outdoor temperature history, compares the trigger value to first and second predetermined switch point temperatures ($T_c$, $T_h$), the first switch point temperature being greater than the second, selects the cooling mode of operation if the trigger value exceeds the first switch point temperature and it is determined to be the cooling season, and selects the heating mode of operation if the trigger value is less than the second switch point temperature and it is determined to be the heating season.

35. The control apparatus of claim 34, wherein said selecting means selects neither the cooling mode nor the heating mode of operation if the trigger value is equal to either the first or second switch point temperature, if the trigger value is between the first and second switch point temperatures, if the trigger value exceeds the first switch point temperature but it is determined to be the heating season, or if the trigger value is less than the second switch point temperature but it is determined to be the cooling season.

36. The control apparatus of claim 34, wherein said selecting means calculates the trigger value based upon average and maximum outdoor temperatures for the most recent period of predetermined duration.

37. The control apparatus of claim 36, wherein said selecting means calculates the trigger value according to the formula:

$$T^* = K_1 T_{84\ avg.\ 24} + K_2 T_{84\ max.\ 24}$$

where T* is the trigger value, $T_{84\ avg.\ 24}$ and $T_{84\ max.\ 24}$ are the most recent 24 hour average and maximum outdoor temperatures, respectively, and $K_1$ and $K_2$ are gain adjustment/conversion factors.

38. The control apparatus of claim 33, further comprising means for determining whether current time is within an on-peak period or an off-peak period in accordance with a current utility schedule, wherein:
   said current utility schedule is stored within said storing means;
   said establishing means establishes, in said cooling mode, an off-peak target storage ice fraction (NEWTAR) based upon outdoor temperature history, current storage temperature and current storage ice fraction; determines a necessary off-peak cooling cycle time (ESTHR) for achieving the off-peak target storage ice fraction; and determines a necessary off-peak cooling cycle starting time (STARTHR) for achieving the off-peak target storage ice fraction during the coolest portion of the off-peak period and by a predetermined off-peak time; and
   said controlling means controls the system so as to operate in the cooling mode if current time is at or after the off-peak cooling cycle starting time and if the current storage ice fraction is less than the off-peak target storage ice fraction.

39. The control apparatus of claim 38, wherein said controlling means prevents operation of the system in the cooling mode during the on-peak period.

40. The control apparatus of claim 38, wherein said establishing means increases the value of the off-peak target storage ice fraction with decreases in current storage ice fraction or increases in current storage temperature, and decreases the value of the off-peak target storage ice fraction with increases in current storage ice fraction or decreases in current storage temperature.

41. The control apparatus of claim 38, wherein said establishing means establishes the off-peak target storage ice fraction based upon average and maximum outdoor temperatures for the most recent period of predetermined duration.

42. The control apparatus of claim 41, wherein said establishing means increases the value of the off-peak target storage ice fraction if either said average or said maximum outdoor temperature has increased, and decreases the value of the off-peak target storage ice fraction if either said average or said maximum outdoor temperature has decreased.

43. The control apparatus of claim 41, wherein said establishing means calculates the value of the off-peak target storage ice fraction in accordance with the formula:

$$NEWTAR = K_1(\% \, ICE_{81}) + K_2(T_{84 \, max. \, 24} - T_{REF1}) + K_3(T_{84 \, avg. \, 24} - T_{REF2}) + K_4(T_{82} - T_{REF3})$$

where NEWTAR is the off-peak target storage ice fraction, $\% \, ICE_{81}$ is the current storage ice fraction, $T_{84 \, max. \, 24}$ and $T_{84 \, avg. \, 24}$ are the most recent 24 hour maximum and average outdoor temperatures, respectively, $T_{82}$ is the current storage temperature, $T_{REF1}$ through $T_{REF3}$ are reference values for 24 hour maximum and average outdoor temperatures and storage temperature, respectively, and $K_1$ through $K_4$ are gain adjustment/conversion factors.

44. The control apparatus of claim 43, wherein said establishing means calculates the off-peak cooling cycle time and the off-peak cooling cycle starting time according to the formulas:

(1) $ESTHR = K_5(NEWTAR - \%ICE_{81}) + K_6(T_{82} - T_{REF4})$, where ESTHR is the off-peak cooling cycle time, $T_{REF4}$ is a reference value for storage temperature, and $K_5$ and $K_6$ are gain adjustment/conversion factors;

(2) $STARTHR = 30 - ESTHR$, where STARTHR is the off-peak cooling cycle starting time; and (3) $STARTHR = (30 - ESTHR) - 24$, where $30 - ESTHR$ is greater than 24.

45. The control apparatus of claim 38, wherein:
said establishing means further establishes, in said cooling mode, off-peak target storage temperature (SENTAR); and
said controlling means controls the system so as to operate in the cooling mode during the off-peak period if the current target storage temperature exceeds the off-peak target storage temperature even if current time is before the off-peak cooling cycle starting time or current storage ice fraction is greater than or equal to the off-peak target storage ice fraction.

46. The control apparatus of claim 38, further comprising:

a storage temperature sensor for detecting an initial presence of storage ice; and
a storage ice/water depth measuring device for detecting the storage ice fraction.

47. The control apparatus of claim 33, further comprising means for determining whether current time is within an on-peak period or an off-peak period in accordance with a current utility schedule, wherein:
said current utility schedule is stored in said storing means;
said establishing means establishes, in said heating mode, an off-peak target storage temperature (HEATAR 2) based upon outdoor temperature history; and
said controlling means controls the system so as to operate in the heating mode during the off-peak period if current storage temperature is less than the off-peak target storage temperature.

48. The control apparatus of claim 47, wherein said controlling means prevents operation of the system in the heating mode during the on-peak period.

49. The control apparatus of claim 47, wherein said establishing means establishes the value of the off-peak target storage temperature based upon average outdoor temperature for the most recent period of predetermined duration.

50. The control apparatus of claim 49, wherein said establishing means increases the value of the off-peak target storage temperature if said average outdoor temperature has decreased, and decreases the value of the off-peak target storage temperature if said average outdoor temperature has increased.

51. The control apparatus of claim 47, wherein:
said establishing means further establishes, in said heating mode, a hysteresis component at a value which is based upon outdoor temperature history and current time; and
said controlling means controls the system so as to commence operation in the heating mode during the off-peak period when current storage temperature is less than the off-peak target storage temperature by an amount equal to said value of said hysteresis component.

52. The control apparatus of claim 47, further comprising means for determining whether a most recent 24 hour minimum outdoor temperature is less than a reference value, and whether current time is between midnight and a predetermined morning time, wherein:
said establishing means further establishes, in said heating mode, a hysteresis component at a first value if the most recent 24 hour minimum outdoor temperature is less than said reference value and current time is between midnight and said predetermined morning time, and said controlling means controls the system so as to commence operation in the heating mode during the off-peak period when current storage temperature is less than the off-peak target storage temperature by an amount equal to said first value of said hysteresis component; and
said establishing means further establishes, in said heating mode, said hysteresis component at a second value, which is larger than said first value, if the most recent 24 hour minimum outdoor temperature is not less than said reference value or current time is not between midnight and said predetermined morning time, and said controlling means controls the system so as to commence operation in the heating mode during the off-peak period when current storage temperature is less than the off-peak target storage temperature by an amount equal to said second value of said hysteresis component.

53. The control apparatus of claim 47, wherein:
said establishing means further establishes, in said heating mode, an on-peak target storage temperature (HEATAR 1) based upon current outdoor temperature; and
said controlling means controls the system so as to operate in the heating mode during the on-peak period if current storage temperature is less than the on-peak target storage temperature.

54. The control apparatus of claim 5, wherein said establishing means increases the value of the on-peak target storage temperature as current outdoor temperature decreases, and decreases the value of the on-peak target storage temperature as current outdoor temperature increases.

55. The control apparatus of claim 5, wherein said establishing means calculates the values of the on-peak and off-peak target storage temperatures according to the formulas:
(1) HEATAR $1 = T_{REF5} - K_8 (T_{84} - T_{REF6})$;
(2) HEATAR $2 = T_{SMA}$ (if $T_{84\ avg.\ 24} < T_{AR}$); and
(3) HEATER $2 = T_{SMA} - M (T_{84\ avg.\ 24} - T_{AR})$, but not less than $T_{SMI}$ (if $T_{84\ avg.\ 24} \geq T_{AR}$)
where HEATAR 1 and HEATAR 2 are respectively the on-peak and off-peak target storage temperatures, $T_{84}$ is the current outdoor temperature, $T_{84\ avg.\ 24}$ is the most recent 24 hour average outdoor temperature, $T_{REF5}$ and $T_{REF6}$ are reference values for on-peak target storage temperature and outdoor temperature, respectively, $T_{SMA}$ and $T_{SMI}$ are maximum and minimum off-peak target storage temperatures, respectively, $T_{AR}$ is a reference value for 24 hour average outdoor temperature, and M is a gain adjustment/conversion factor.

56. The control apparatus of claim 33, further comprising a depth measuring device for detecting the level of storage liquid, wherein said controlling means activates an automatic storage tank refill valve when the depth measuring device determines storage liquid depth to be below a predetermined level.

57. The control apparatus of claim 56, said depth measuring device including:
means for projecting an ultrasonic ray onto the surface of the storage liquid;
means for sensing the ultrasonic ray after being reflected from the surface of the storage liquid; and
means for generating an output voltage proportional to the total travel distance of the ultrasonic ray.

58. The control apparatus of claim 57, said depth measuring device further including horizontal and vertical tubes through which said ultrasonic ray is transmitted, and an angled reflection surface between the horizontal and vertical tubes for providing horizontal-to-vertical-to-horizontal transition.

59. The control apparatus of claim 33, further comprising a building heat exchanger, wherein said controlling means prevents delivery of storage liquid to the building heat exchanger when outdoor temperature is below a first predetermined value and storage liquid temperature is below a second predetermined value, or when outdoor temperature exceeds a third predetermined value and storage liquid temperature exceeds a fourth predetermined value.

60. The control apparatus of claim 33, further comprising means for determining whether current time is within an on-peak period or an off-peak period in accordance with a current utility schedule, wherein:
said current utility schedule is stored in said storing means; and
said controlling means controls the system so as to operate during the on-peak period to produce domestic hot water if current domestic hot water tank temperature is less than a first predetermined value (DHWTAR 1), and so as to operate during the off-peak period to produce domestic hot water if current domestic hot water tank temperature is less than a second predetermined value (DHWTAR 2), the second value being greater than the first.

61. The control apparatus of claim 60, wherein said controlling means gives priority to domestic hot water production over space conditioning functions.

62. The control apparatus of claim 60, further comprising an outdoor heat exchanger and an outdoor heat exchanger fan, wherein said controlling means controls the system so as to operate to produce domestic hot water without operation of the outdoor heat exchanger fan when current domestic hot water tank temperature is greater than a third predetermined value which decreases continuously as outdoor temperature increases.

63. The control apparatus of claim 62, wherein said controlling means utilizes one value as said third predetermined value when current storage temperature is greater than or equal to current outdoor temperature, and utilizes another value as said third predetermined value when current storage temperature is below current outdoor temperature.

64. The control apparatus of claim 33, further comprising a compressor, a compressor crankcase heater, an outdoor heat exchanger coil, and sensors for measuring compressor and outdoor heat exchanger coil temperatures, wherein said controlling means activates the compressor crankcase heater when current compressor temperature is lower than one of current storage temperature and current outdoor heat exchanger coil temperature.

65. The control apparatus of claim 33, further comprising an outdoor heat exchanger coil, wherein said controlling means controls the system so as to defrost the outdoor heat exchanger coil during the heating mode of operation in accordance with a first defrost mode when current outdoor temperature exceeds a predetermined value, and in accordance with a second defrost mode when current outdoor temperature is equal to or less than said predetermined value.

66. The control apparatus of claim 65, further comprising a compressor, an outdoor heat exchanger fan, and a system cooling valve, wherein said controlling means controls the system so as to defrost the outdoor heat exchanger coil in said first defrost mode by deactivating the compressor while operating the outdoor heat exchanger fan and the system cooling valve to permit hot refrigerant to flow into the outdoor heat exchanger coil, and in the second defrost mode by operating the system in cooling mode with the outdoor heat exchanger fan deactivated.

* * * * *